United States Patent [19]
Heath et al.

[11] Patent Number: 5,545,803
[45] Date of Patent: Aug. 13, 1996

[54] HEATING OF SOLID EARTHEN MATERIAL, MEASURING MOISTURE AND RESISTIVITY

[75] Inventors: William O. Heath; Phillip A. Gauglitz; Gautam Pillay; Theresa M. Bergsman; Eugene A. Eschbach; Steven C. Goheen, all of Richland; Richard L. Richardson, West Richland; Janet S. Roberts, Pasco; Ronald Schalla, Kennewick, all of Wash.

[73] Assignee: Battelle Memorial Institute, Richland, Wash.

[21] Appl. No.: 268,490

[22] Filed: Jun. 30, 1994

Related U.S. Application Data

[63] Continuation-in-part of Ser. No. 792,213, Nov. 13, 1991, Pat. No. 5,347,070.

[51] Int. Cl.$^6$ .................................................. A62D 3/00
[52] U.S. Cl. ........................ 588/253; 405/128; 405/131
[58] Field of Search .................................. 405/128, 131, 405/258, 129; 588/253; 166/248, 272

[56] References Cited

U.S. PATENT DOCUMENTS

| | | | |
|---|---|---|---|
| 4,900,196 | 2/1990 | Bridges | 405/131 X |
| 4,956,535 | 9/1990 | Buelt et al. | 405/258 X |
| 4,957,393 | 9/1990 | Buelt et al. | 405/128 |
| 5,024,556 | 6/1991 | Timmerman | 405/129 X |
| 5,347,070 | 9/1994 | Heath et al. | 588/253 |

*Primary Examiner*—Dennis L. Taylor
*Attorney, Agent, or Firm*—Johnnie R. Hynson

[57] ABSTRACT

The present invention includes a method of treating solid earthen material having volatile, semi-volatile, and non-volatile contaminants that utilizes electrical energy. A plurality of electrodes are inserted into a region of earthen material to be treated in a selected geometric pattern. Varying phase and voltages configurations are applied to corresponding electrodes to achieve heating, physical phase changes, and the placement of substances within the treatment region. Additionally, treatment mediums can be added to either treat the contamination within the soil or to restrict their mobility.

64 Claims, 23 Drawing Sheets

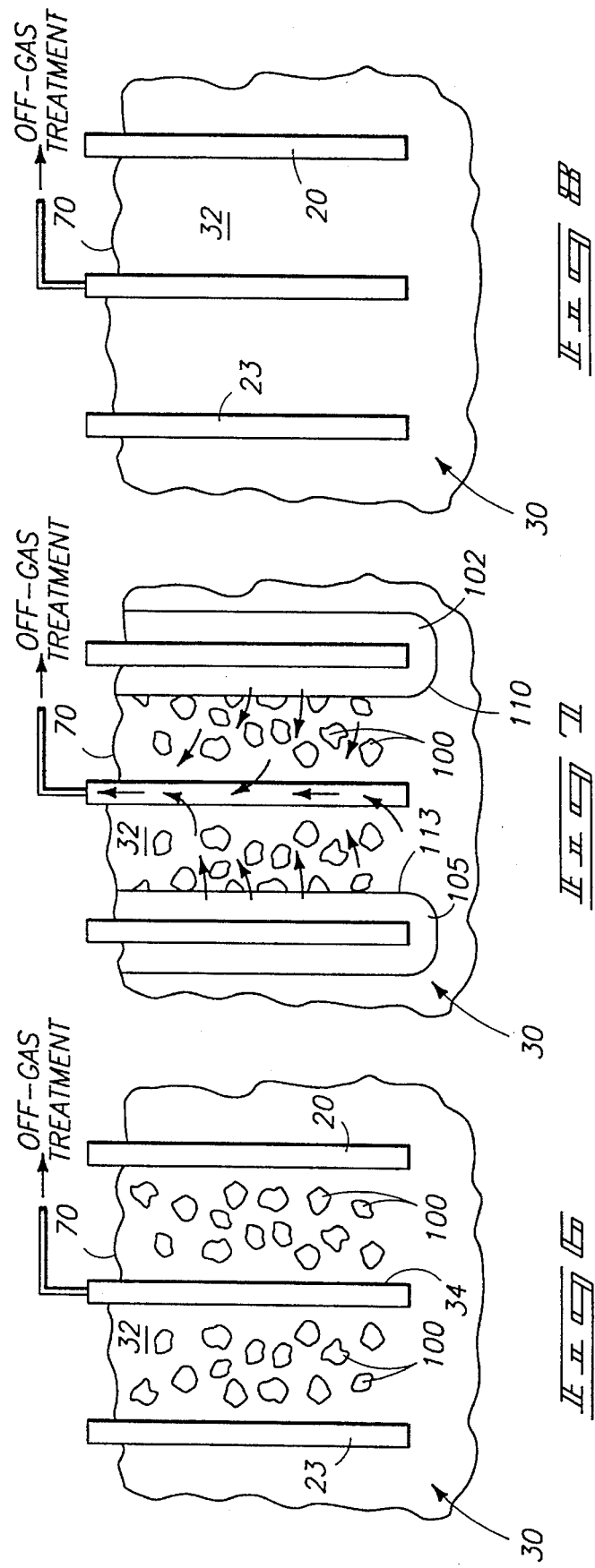

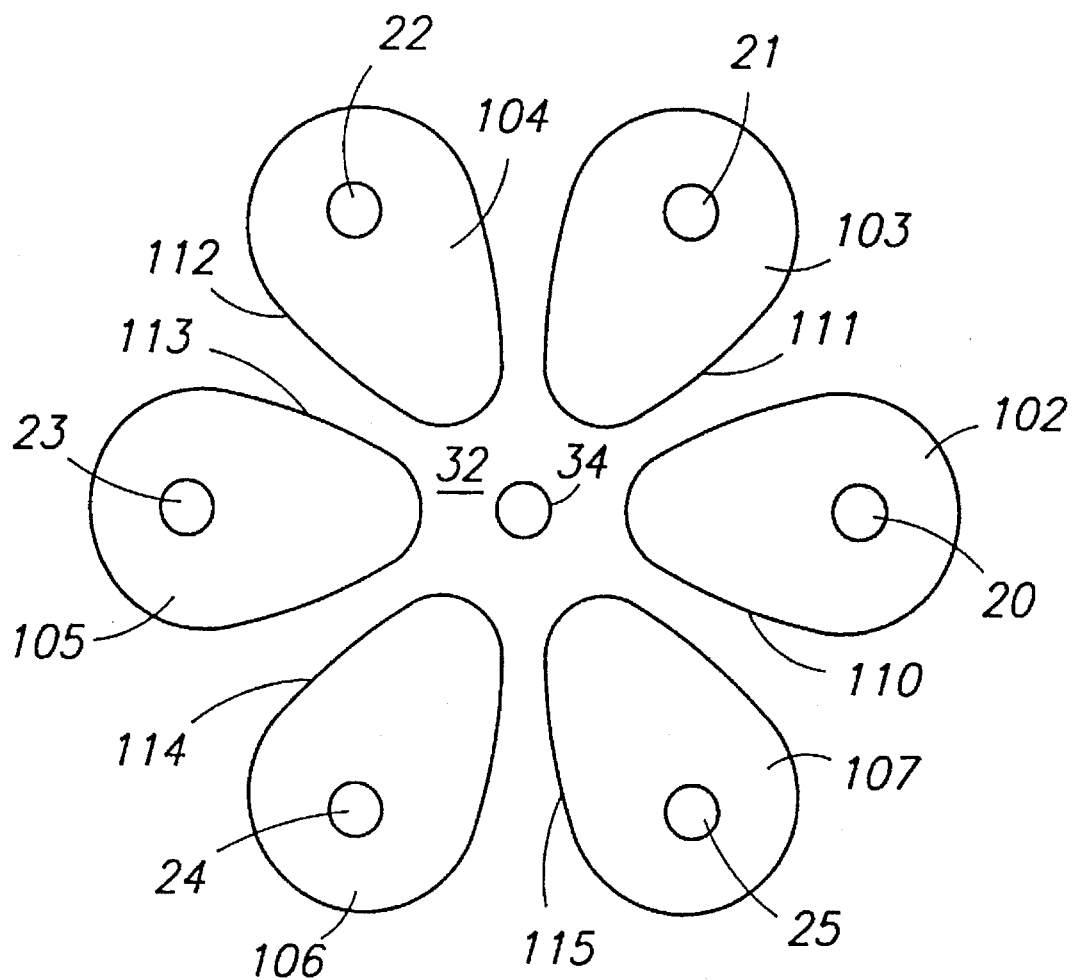

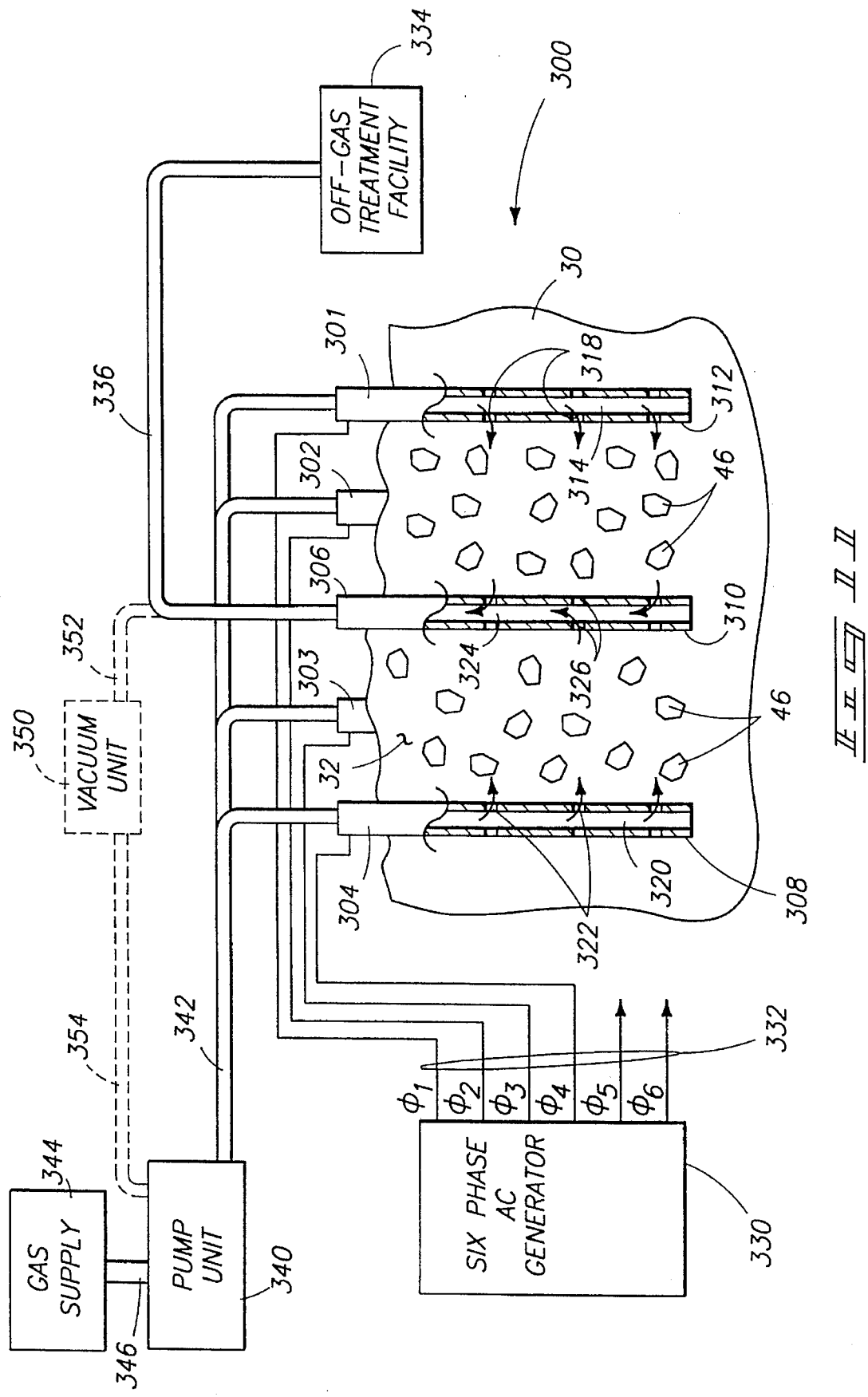

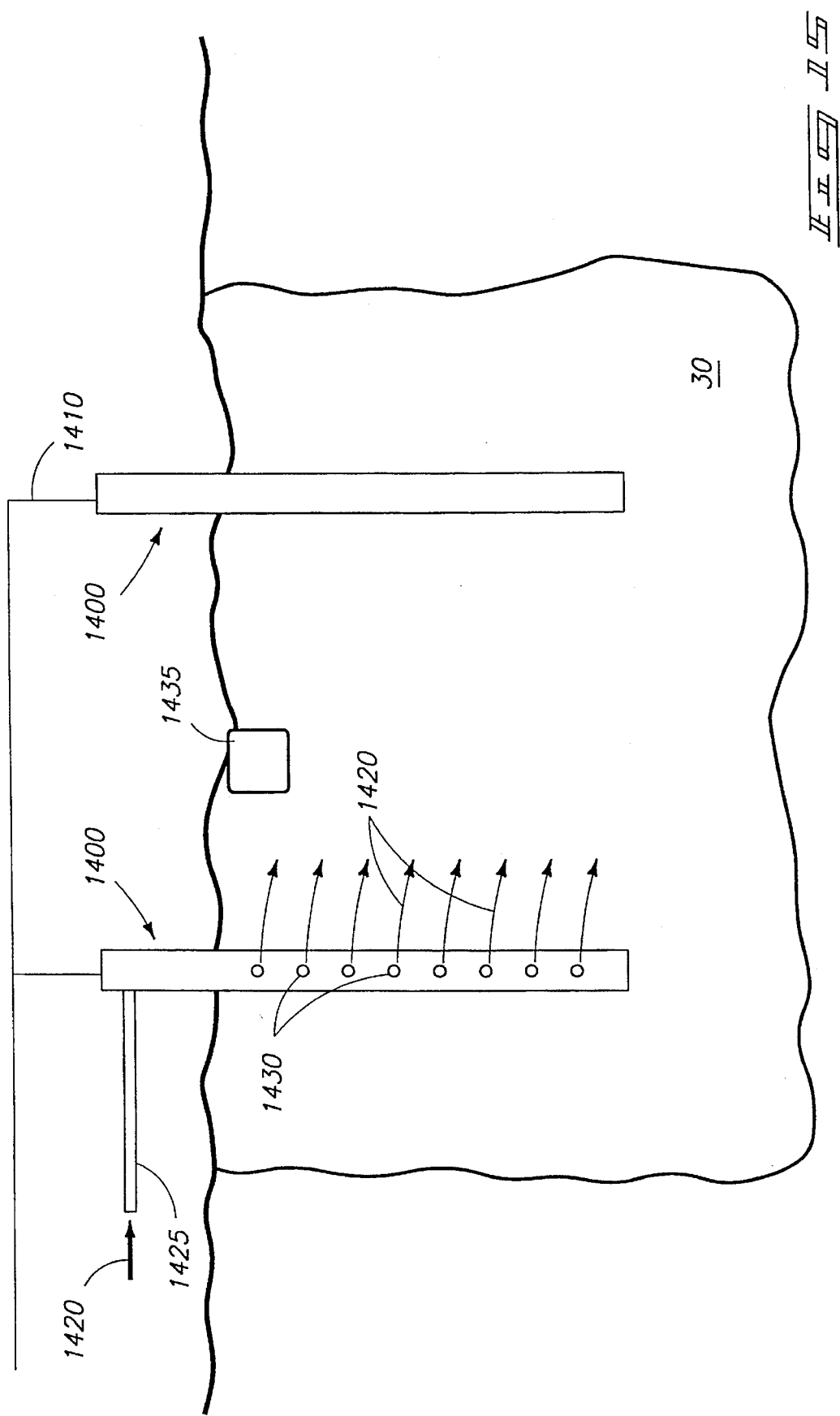

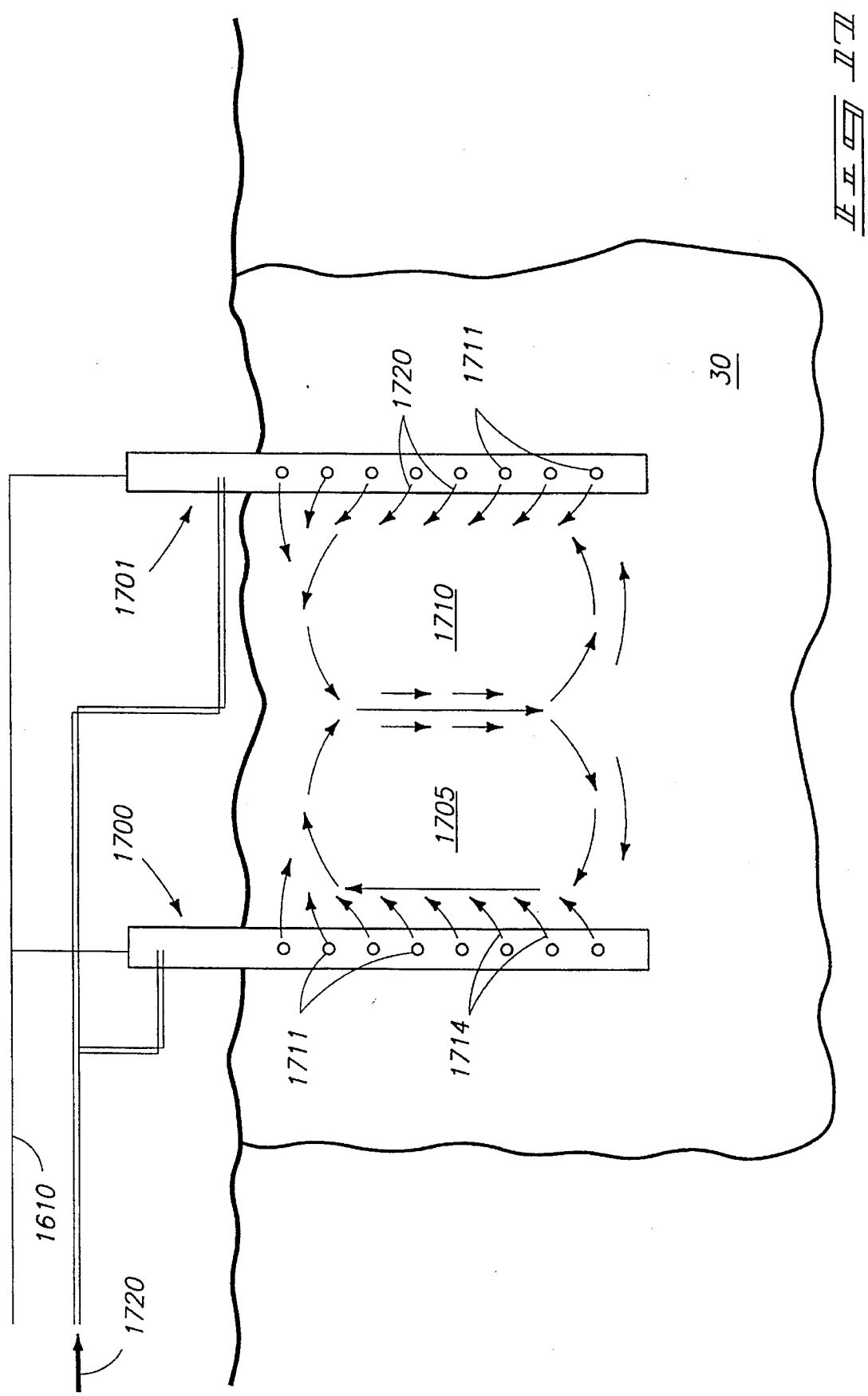

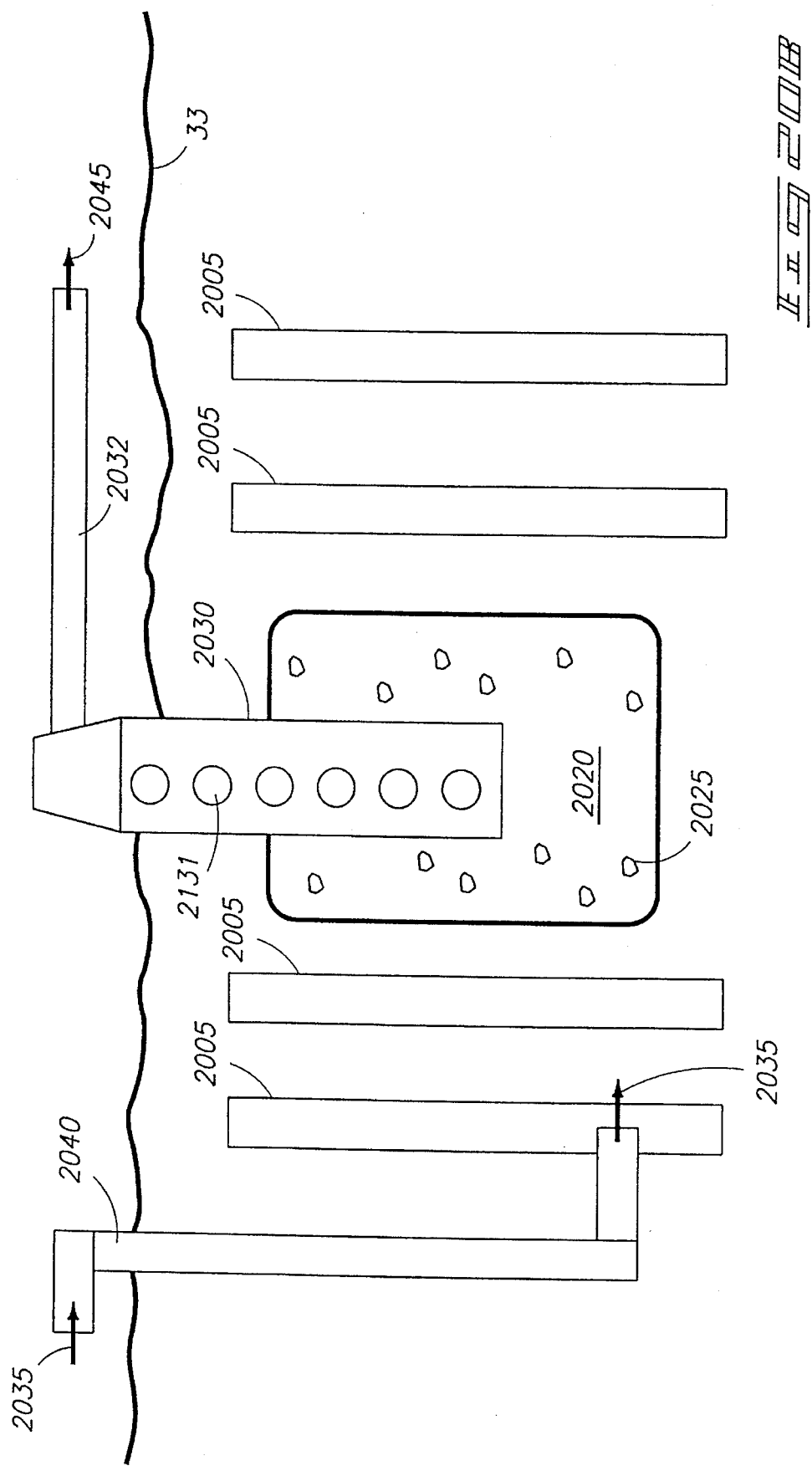

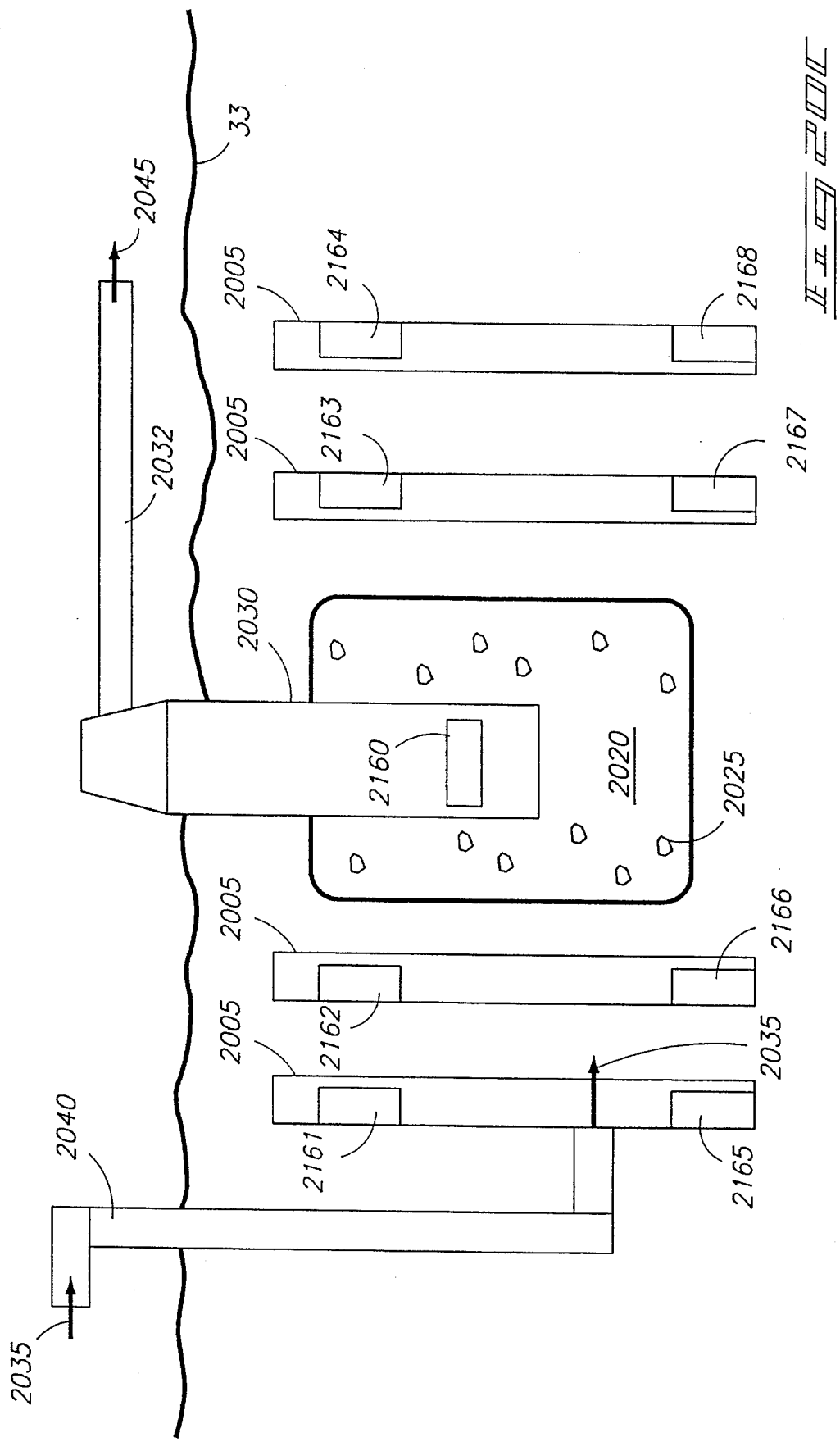

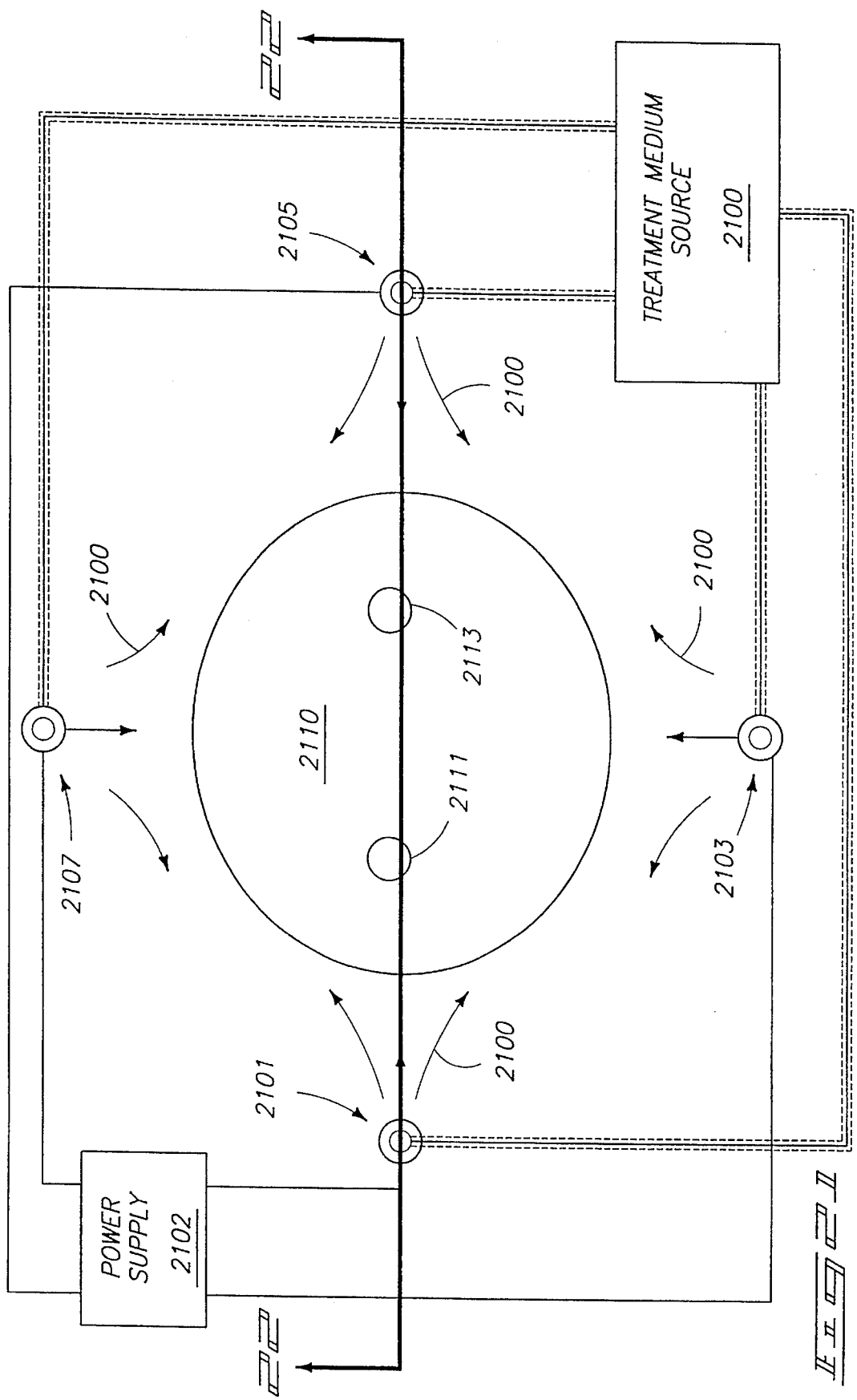

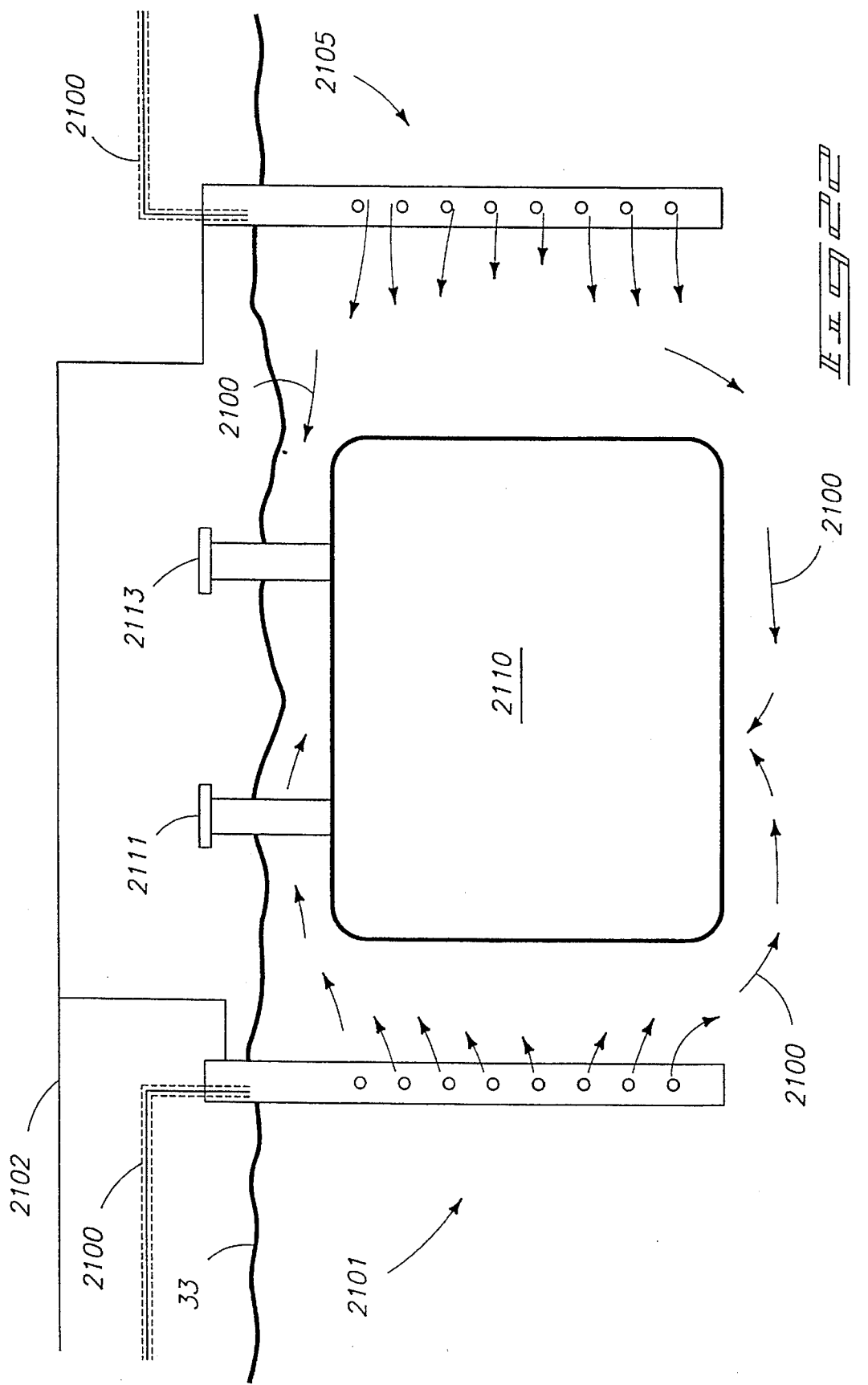

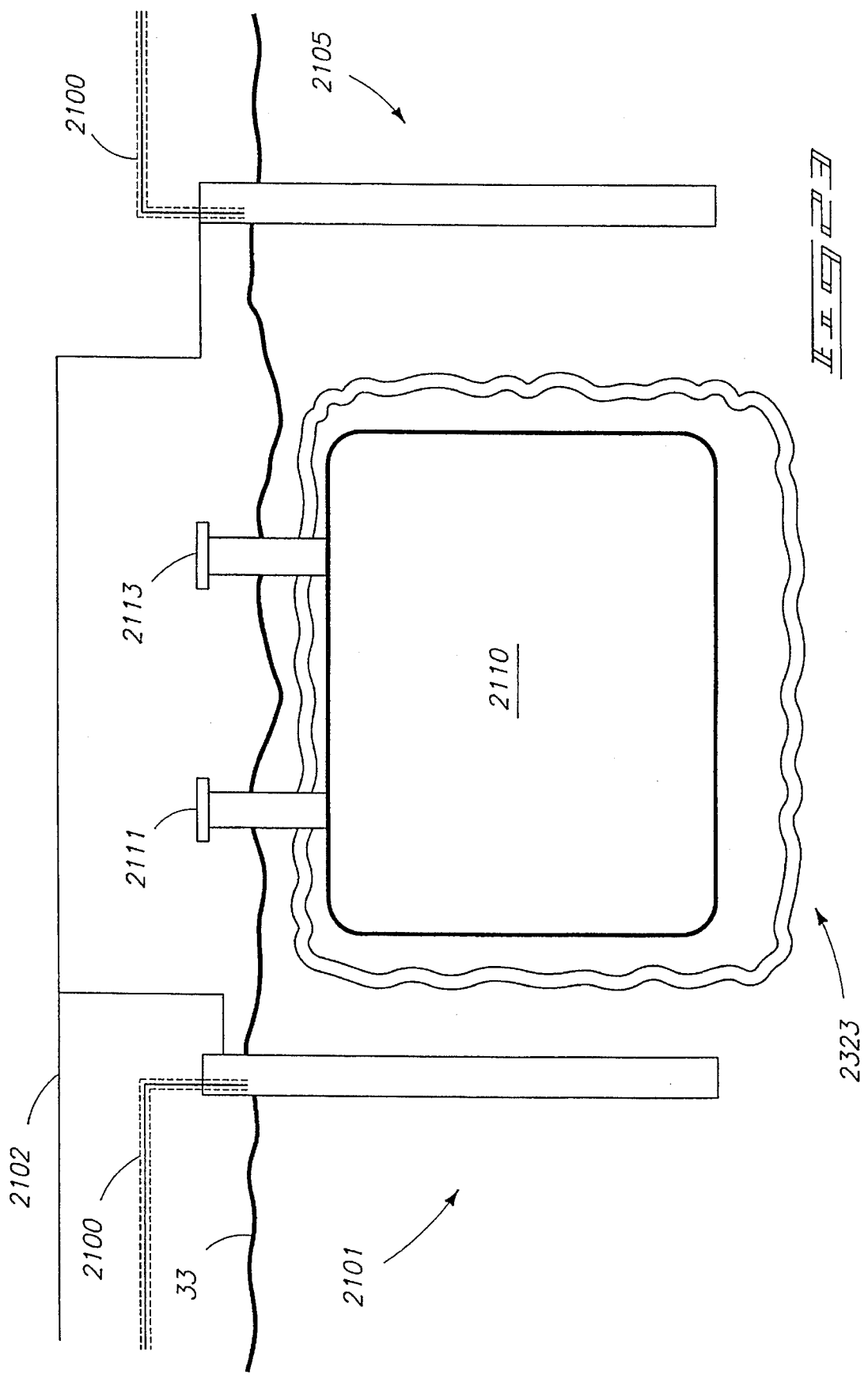

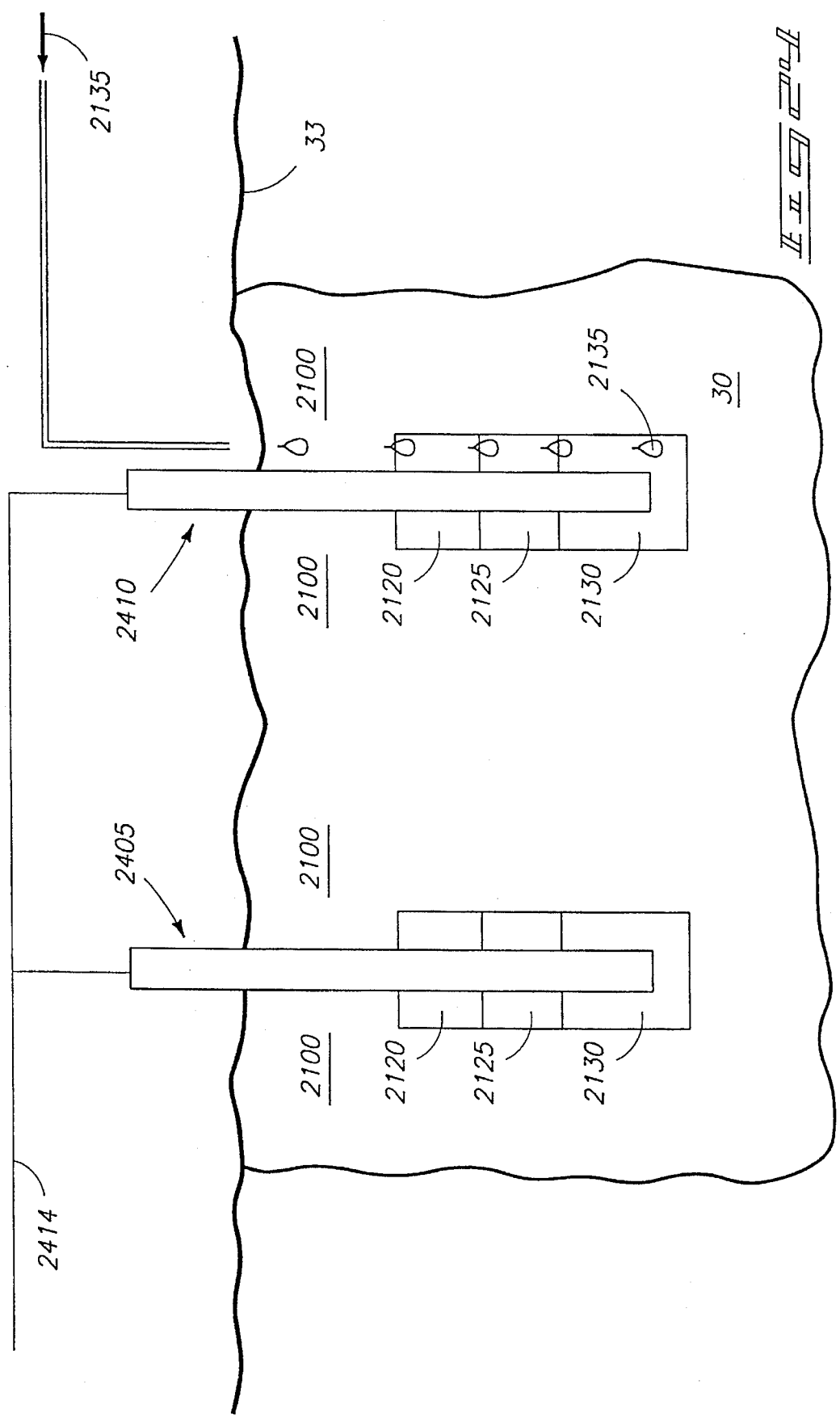

HEATING OF SOLID EARTHEN MATERIAL, MEASURING MOISTURE AND RESISTIVITY

This invention was made with Government support under Contract DE-AC06-76RLO 1830 awarded by the U.S. Department of Energy. The Government has certain rights in the invention.

This application is a Continuation-In-Part of U.S. patent application, Ser. No. 07/792,213, filed Nov. 13, 1991, now U.S. Pat. No. 5,347,070.

FIELD OF THE INVENTION

This invention relates to a method for treating solid earthen material. This invention also relates to a method for measuring moisture content and resistivity of solid earthen material. The invention more particularity relates to the addition of a treatment medium to the solid earthen material to either immobilize or treat contaminants located therein. The invention further relates to controlling the flow of the treatment medium to the treatment region.

BACKGROUND OF THE INVENTION

The disposal of contaminated material has become an increasingly significant problem. Today, contaminated material, such as industrial and nuclear waste, is buried underground in specially designed storage containers. These contaminants buried in the ground typically contain volatile, semi-volatile, and non-volatile organic contaminants. Unfortunately, burying the contaminants does not render them innocuous to the environment. The storage containers can leak the contaminants into the soil, render them innocuous to the environment. The storage containers can leak the contaminants into the soil, thereby polluting the soil. The contaminants may also pass into underground water tables and contaminate the water supply for populated regions. Ground contaminants can also result from surface spills that seep into the soil.

One approach to detoxifying organic-contaminated soils was proposed by Buelt et al. in U.S. Pat. No. 4,957,393, assigned to Battelle Memorial Institute. Buelt et al. proposed inserting a matrix of electrodes into a contaminated soil region and applying very high dc voltage or single phase ac voltage to the electrodes. The voltages created current paths between the electrodes which effectively heated the contaminated soil to temperatures ranging from 100° C. to 1200° C.

The present invention arose out of a need to provide a more energy efficient and less costly system for treating contaminated soils. The present invention provides a method for treating contaminated soil which enables uniform heating of the soil at relatively low energy costs.

BRIEF DESCRIPTION OF THE DRAWINGS

Preferred embodiments of the invention are described below with reference to the following accompanying drawings.

FIG. 3 also illustrates one embodiment for venting contaminants from solid earthen material.

FIG. 4 is a top plan view illustrating an arrangement of twelve electrodes in accordance with another aspect of the present invention.

FIG. 5 is a top plan view illustrating an arrangement of twelve electrodes in accordance with yet another aspect of the present invention.

FIG. 6 diagrammatically illustrates an initial step to chemically altering contaminants disposed in solid earthen material.

FIG. 7 diagrammatically illustrates a formation and expansion of a dry region formed at a time subsequent to the step shown by FIG. 6.

FIG. 8 diagrammatically illustrates a region of earthen material at a time subsequent to the step shown by FIG. 7.

FIG. 9 is a top plan view of the electrodes illustrating the formation of dry regions in accordance with an aspect of the present invention.

FIG. 11 also illustrates recycling off gas into a region of solid earthen material for further treatment.

FIG. 13 diagrammatically illustrates a process for forming vitrescent soil fragments in accordance with another aspect of the present invention.

FIG. 14 is a below grade section showing addition of fixant.

FIG. 15 diagrammatically illustrates the addition of natural gas to augment the heating of the soil.

FIG. 17 diagrammatically illustrates the side view of a convection vortex created by electrode heating.

FIG. 20b is a side view that diagrammatically illustrates the electrokinetic movement of fluid for the treatment of contaminants in soil.

FIG. 21 diagrammatically illustrates the top view of an underground storage tank surrounded by a configuration of electrodes from which is injected a fixant into the area surrounding the tank.

FIG. 22 diagrammatically illustrates the side view of an underground storage tank surrounded by a configuration of electrodes from which is injected a fixant into the area surrounding the tank.

FIG. 23 diagrammatically illustrates the top view of an underground storage tank surrounded by a configuration of electrodes from which is injected a fixant into the area surrounding the tank which has solidified into a barrier.

FIG. 24 diagrammatically illustrates a side top view of the immediate vicinity of the electrodes packed with a conducting powder to which a conducting liquid is added.

Figure 1:
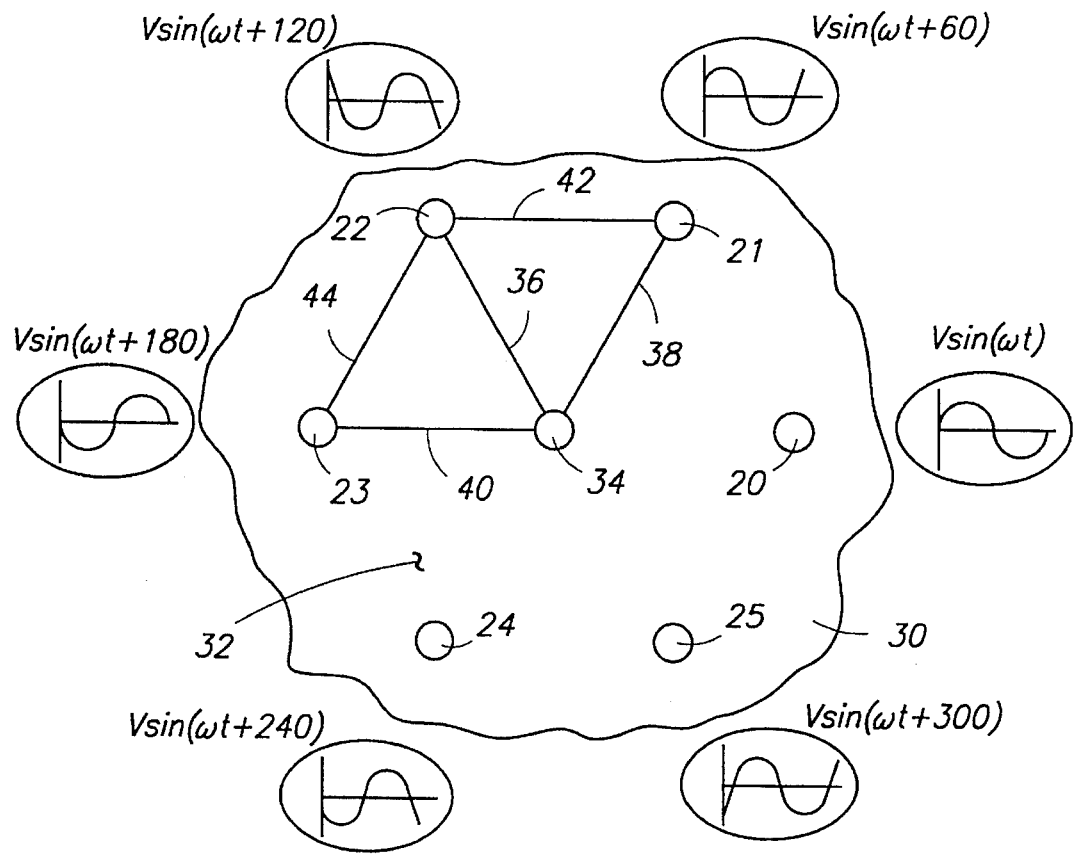
FIG. 1 is a top plan view of a hexagonal electrode arrangement capable of supporting six phases of voltages in accordance with an aspect of the present invention.

According to one aspect of the present invention, a method of treating solid earthen material 30 comprises the steps of:

(a) inserting a plurality of electrodes into a region of solid earthen material 30 to be treated; and (b) applying at least six phases of voltages to corresponding ones of the electrodes to create current paths between at least two electrodes and through the region of material. The voltage applied may be ac or dc. Single phase or multiple phase voltage may be applied to the electrodes. Voltages, voltage, potential, and potential difference, all are indicative of a difference of electrical potential between two reference points.

Referring now to FIG. 14, another aspect of the instant invention is illustrated. As with the other embodiments, electrical power 1400 is applied to at least one electrode 1410 that is disposed within a treatment region 30.

Any of the above embodiments may be used in conjunction with, or combination with, the addition of a treatment medium 1405. The treatment medium 1405 can include the addition of substances to enhance bioremediation, fixants, or chemical reactants.

Treatment mediums to control the mobility of the contaminants in-place are termed fixants. Fixants may either fix the contaminants into place, encapsulate the contaminants into place, or restrict the movement of contaminants within the medium to be treated.

Treatment mediums may be added to the treatment region 30 via electrode openings 1410, or via conduits 1415 with conduit openings 1411, inserted in the treatment region 30 for that purpose. The treatment medium is typically transported to the electrode or conduit by pipes, hoses, or tubing (collectively illustrated as 1420).

"Solid earthen material 30", also referred to as soil 30, as used in this disclosure means fragmental material composing part of the surface of the globe. The term "solid earthen material 30" includes fine, densely packed particles having moisture interspersed between the particles, ground, dirt, sand, soil, sludge, slurry, mud, shale, in-situ material, and material which has been extracted and removed from their native location, etc.

Also included are any man-made materials, including but not limited to ash, sludge, mill tailings, spent ores, etc.

Constituents of the solid earthen material 30 refers to any material located within the physical boundary of the medium to be treated.

Contaminants refers to any constituent of the soil 30 that is the object of the treatment to be performed on that soil 30.

The above method may further comprise:

(a) arranging the plurality of electrodes in a geometric configuration having diametrically opposing pairs of electrodes, the pairs defining opposing first and second electrodes; and (b) applying first and second phases of voltages to the respective first and second electrodes of respective pairs of electrodes, the first and second phases of voltages having voltage amplitudes which are substantially equal, the first and second phases being approximately 180° out of phase with respect to one another.

The six electrodes can be positioned in the solid earthen material 30, and the six phases of voltages applied to the electrodes in a manner effective to produce a substantially constant voltage-to-distance ratio for all current paths between electrode pairs. The voltage-to-distance ratio for a given pair of electrodes is computed by dividing the voltage measured between the given pair of electrodes by the distance between the given pair of electrodes.

According to another aspect of the present invention, a method of treating solid earthen material 30 comprises of the steps of:

(a) inserting a plurality of electrodes into a region of solid earthen material 30 to be treated;

(b) applying at least six phases of voltages to corresponding ones of the electrodes to create current paths between pairs of the electrodes and through the region of material; and (c) heating the region of material to a temperature below a melting temperature of the solid earthen material 30, with a preferred temperature ranging from about 0° C. to 100° C.

According to still another aspect of the present invention, a method of treating solid earthen material 30 is illustrated in FIG. 15, which comprises of the steps of:

(a) Inserting a plurality of electrodes 1500 into a region of solid earthen material 30 to be treated.

(b) Applying electrical power 1510 to corresponding ones of the electrodes 1500 to create current paths for heating and drying the region between pairs of the electrodes 1500, and through the region of material, thus increasing its permeability.

(c) Injecting a combustible fluid 1520 into the soil or the treatment region. Any combustible compound of sufficient mobility can be used. Natural gas is particularly suited for this purpose and may be injected in the treatment region 30 via a conduit 1525. The conduit 1525 is inserted directly into the region. Alternatively, the combustible fluid 1520 may be fed into the treatment region via a hollow electrode 1500 and dispersed over the treatment area via electrode openings 1530. When the fluid reaches the corona in the vicinity of the electrode 1500, it will be ignited. In the embodiments, where a lower temperature is desired, an ignition system 1535 can be provided. The type of ignition system is not critical to the practice of the invention. Types include torches, electrical sparks, chemical flames, etc. Once ignited the heat produced can augment the heat supplied by the electrodes 1500.

(d) Heating the region of material to a temperature below a melting temperature of the solid earthen material 30, with a preferred temperature ranging from about 100° C. to 800° C. However, if sufficient quantities of fluid and electrical power is provided, the soil can be heated to any desired temperature above 100° C., up to and including vitrification temperature.

It should be noted that when soil is heated by the instant invention, moisture is removed. This removal of moisture makes the soil more permeable to gas. The treatment region forms a definable treatment region that is bowl-like in shape, through which gases will tend to flow more freely. Thus, gases that are heavier than ambient air will tend to stay in that region.

According to another aspect of the present invention, a method of treating solid earthen material 30 comprises the steps of:

(a) inserting a plurality of peripheral electrodes into solid earthen material 30, the peripheral electrodes being arranged in a selected geometric perimeter which defines an internal region of material to be treated;

(b) inserting at least one electrically neutral electrode in the region of material to be treated; and (c) applying multiple phases of voltages to corresponding ones of the peripheral electrodes to create current paths between (1) pairs of the peripheral electrodes, and (2) the peripheral electrodes and the neutral electrode, the current paths passing through and substantially uniformly heating the region of material.

The peripheral electrodes can be arranged at vertices of a substantially equilateral polygon having at least six sides. The neutral electrode would then preferably be positioned in a substantially diametric center of the region of material.

The neutral electrode may be formed with a passage therethrough which communicates with the solid earthen material 30, and a location external to the solid earthen material 30. In this manner, gases from the region of material may be removed through the passage in the neutral electrode.

The neutral electrode also enables the use of wye connections of the electrodes when using a three-phase power source. The neutral electrode also is integral to the defining of the region around which the corona expands.

According to yet another aspect of the present invention, a method for treating solid earthen material 30 comprises the steps of:

(a) inserting first, second, third, fourth, fifth, and sixth electrodes into solid earthen material (b) applying a first phase of voltage to the first electrode;

(c) applying a second phase of voltage to the second electrode;

(d) applying a third phase of voltage to the third electrode;

(e) applying a fourth phase of voltage to the fourth electrode;

(f) applying a fifth phase of voltage to the fifth electrode;

(g) applying a sixth phase of voltage to the sixth electrode;

(h) the voltages applied to the first, second, third, fourth, fifth, and sixth electrodes being sufficient to create current paths between pairs of the electrodes through the material, the current paths heating the material.

The first through sixth electrodes can be arranged at vertices of a substantially equilateral hexagon.

According to another aspect of the present invention, a method for treating solid earthen material having volatile, semi-volatile, and non-volatile contaminants, comprising the steps of:

(a) inserting multiple electrodes into solid earthen material (b) applying multiple phases of voltages to corresponding ones of the electrodes;

(c) adjusting the voltages within a first selected range of voltages to heat the material to a temperature sufficient to substantially remove volatile and semi-volatile contaminants from the material; and (d) increasing the voltages through a second selected range of voltages effective to create a corona front which decomposes the non-volatile contaminants.

The first selected range of voltages is preferably less than the second selected range of voltages. Moreover, the temperature sufficient to substantially remove volatile and semi-volatile contaminants is less than a melting temperature of the solid earthen material 30.

It should be noted that volatile, semi-volatile, and non-volatile contaminants can also be referred to throughout this application collectively as contaminants.

According to yet another aspect of the present invention, a method for treating solid earthen material 30 having volatile, semi-volatile, and non-volatile contaminants, comprising the steps of:

(a) inserting multiple electrodes into solid earthen material 30, the electrodes defining a region of material to be treated;

(b) applying multiple phases of voltages to corresponding ones of the electrodes;

(c) adjusting the voltages within a first selected range of voltages to heat the material to a temperature sufficient to substantially remove volatile and semi-volatile contaminants from the region of material;

(d) creating dry regions of material around individual electrodes as the material is heated, the dry regions having a periphery which defines a boundary between the dry regions of material and earthen material exterior to the dry regions.

(e) increasing the voltages to a second range of voltages to create a corona at the boundary between the dry regions of material and earthen material exterior to the dry regions;

(f) moving the boundary of the dry regions radially outward from the individual electrodes through the region of material, the corona being moved with the boundary of the dry regions;

(g) decomposing the non-volatile contaminants as the corona-carrying boundary passes over the non-volatile contaminants; and (h) removing decomposition products by venting.

According to yet another aspect of the present invention, a method for treating solid earthen material 30 having volatile, semi-volatile, and non-volatile contaminants in the presence of microbial organisms comprises the steps of:

(a) inserting a plurality of electrodes into solid earthen material 30, the electrodes being arranged in a selected geometric perimeter defining a region of material to be treated;

(b) applying at least six phases of voltages to corresponding ones of the electrodes;

(c) adjusting the voltages within a first selected range of voltages to heat the material substantially uniformly throughout the region to a temperature sufficient to promote activity of microbial organisms of feeding on volatile, semi-volatile, and non-volatile contaminants from the region of material;

(d) controlling the voltages for maintaining the temperature of the material for a time sufficient for the microbial organisms to substantially remove the volatile, semi-volatile, and non-volatile contaminants from the region of material, removal including, but not limited to, decomposition, bioaccumulation, or relocation; and (g) removing decomposition products by venting.

According to yet another aspect of the present invention, a method for treating solid earthen material 30 having volatile, semi-volatile, and non-volatile contaminants in the presence of microbial organisms, is illustrated in FIG. 15 and comprises the steps of:

(a) inserting a plurality of electrodes 1500 into solid earthen material 30, the electrodes 1500 being arranged in a selected geometric perimeter defining a region of material, also referred to as a treatment region, to be treated;

(b) applying at least six phases of voltages 1510 to corresponding ones of the electrodes 1500;

(c) adjusting the voltages 1510 within a first selected range of voltages to heat the material substantially uniformly throughout the region to a temperature sufficient to promote activity of microbial organisms of feeding on volatile, semi-volatile, and non-volatile contaminants from the region of material;

(d) controlling the voltages for maintaining the temperature of the material for a time sufficient for the microbial organisms to substantially remove the volatile, semi-volatile, and non-volatile contaminants from the region of material; and (e) adding a treatment medium 1520 that enhances the bioremediation of the volatile, semi-volatile, and non-volatile contaminants, the treatment medium 1520 being fed into the soil directly via a conduit 1525, or via electrode openings 1530 in a hollow electrode 1500.

The addition of a treatment medium being preferred through the peripheral electrodes themselves when temperatures are conducive for that purpose. For example, the heat of the electrode could prevent clogging due to reduced activity in the immediate vicinity of the injection. The reduced activity is due to the temperature in the immediate vicinity of the electrode being too high for the bioremediation agent (generally microorganisms). This eliminates clogging in the immediate vicinity of the electrodes, which is one of the largest problems in injection of nutrients.

A treatment medium in the context of bioremediation is contemplated to include, but is not limited to, electron acceptors, electron donors, water, air, oxygen, nitrogen gas, or nutrients.

The addition of nutrients, and some other treatment mediums, to the soil is complicated by the rapid growth of the microbes in those regions. This rapid growth may cause plugging in the areas of injection. The instant invention enables the avoidance of this problem by injecting the treatment medium via the electrodes. Since the electrode provides heating to the immediate vicinity of the electrode, there is a retardation of microbial growth in that region. The retardation enables the reduction, or total elimination, of the plugging.

Various aspects of the invention are more fully described by reference to the accompanying figures. Specifically, FIG. 1 illustrates an electrode arrangement and voltage configuration suitable for treating solid earthen material 30 in accordance with the present invention. Six electrodes (20–25) are inserted into a solid earthen material 30 to be treated. The area that is treated is also referred to as the reaction region 30. Electrodes 20–25 may be formed of aluminum, carbon steel, or any other type of conductive material. Electrodes 20–25 are preferably cylindrical and can be hollow or solid. Hollow electrodes 20–25 may be simultaneously used as conduits.

Six phases of ac voltages are applied to corresponding electrodes 20–25. Preferably, each electrode has a voltage phase which is 60° out of phase with the voltages of adjacent electrodes. For instance, electrode 20 has a voltage phase 60° apart from the voltage phase applied to electrode 21. To further illustrate the different phases of voltages applied to electrodes 20–25, exemplary wave forms of different phases are shown adjacent respective electrodes 20–25. Electrode 20 has a voltage $V\sin(\omega t)$; electrode 21 has a voltage $V\sin(\omega t+60)$; electrode 22 has a voltage $V\sin(\omega t+120)$; electrode 23 has a voltage $V\sin(\omega t+180)$; electrode 24 has a voltage $V\sin(\omega t+240)$; and electrode 25 has a voltage $V\sin(\omega t+300)$.

Electrodes 20–25 are preferably arranged in a geometric configuration in which pairs of electrodes are diametrically opposite one another. Electrodes 20, 21, and 22 are diametrically opposite electrodes 23, 24, and 25, respectively. Electrodes 20–25 are most preferably positioned at vertices of a substantially equilateral hexagon as shown.

The voltages applied to diametrically opposing pairs of electrodes preferably have voltage amplitudes which are substantially equal, as indicated by the voltage amplitude V. Additionally, the voltages applied to diametrically opposing electrodes are preferably approximately 180° out of phase with respect to one another. For example, the voltage applied to electrode 20 is 180° out of phase with the voltage applied to electrode 23. Similarly, the voltage applied to electrode 2Z is approximately 180° out of phase with the voltage applied to electrode 24.

The six phases of voltages applied to electrodes 20–25 may be applied at any frequency. The voltages are preferably applied at power frequencies less than 500 Hz, and most preferably at a frequency of approximately 60 Hz. In this manner, power voltages carried by standard transmission lines may be used to drive the six phases of voltages applied to electrodes 20–25. Using a 60 Hz, six-phase voltage provides a significant advantage in that the current supplied to electrodes 20–25 is in phase with the driving voltages from power lines. This results in a significant reduction in transformer losses.

Referring to FIG. 9, another aspect of the instant invention is illustrated. This embodiment includes positioning an electrically neutral electrode 34 centrally in a region 32 of solid earthen material 30. Region 32 is internal to a perimeter defined by electrodes 20–25. Neutral electrode 34 is preferably positioned in a substantially diametric center of the hexagon formed by electrodes 20–25. When the multiple phases of voltages (preferably six phases) are applied to electrodes 20–25, current paths between peripheral electrodes 20–25 and neutral electrode 34 are created, as represented by current paths 36, 38, and 40. Additionally, current paths are created between pairs of peripheral electrodes 20–25, as represented by current path 42 between a pair of electrodes, 2Z and 22, and current path 44, between a pair of peripheral electrodes 22 and 23.

The current paths created between pairs of peripheral electrodes 20–25 (i.e., current paths 42 and 44) and between electrodes 20–25, and neutral electrode 34 (i.e., current paths 36, 38, and 40) pass through and substantially uniformly heat region 32 of solid earthen material 30. Region 32 is preferably heated to a temperature below a melting temperature of solid earthen material 30. Most preferably, region 32 is heated to a temperature ranging from about 0° C. to 100° C. When used to enhance biodegradation by action of microbial organisms, region 32 is heated to a temperature ranging from about 20° C. to 40° C. and preferably about 30° C.

With the hexagonal arrangement, multiple phases of voltages can be applied to peripheral electrodes 20–25 in a manner effective to produce a substantially constant voltage-to-distance ratio for all current paths between peripheral electrodes 20–25 (i.e., current paths 42 and 44) and between peripheral electrodes 20–25 and neutral electrode 34 (i.e., current paths 36, 38, and 40). The voltage-to-distance ratio between any given pair of electrodes (for example, current path 44 between a pair of peripheral electrodes 22 and 23, or current path 38 between a pair of peripheral electrodes 21 and neutral electrode 34) is computed by dividing the voltage measured between the given pair of electrodes and the distance by the given pair of electrodes.

Figure 2:
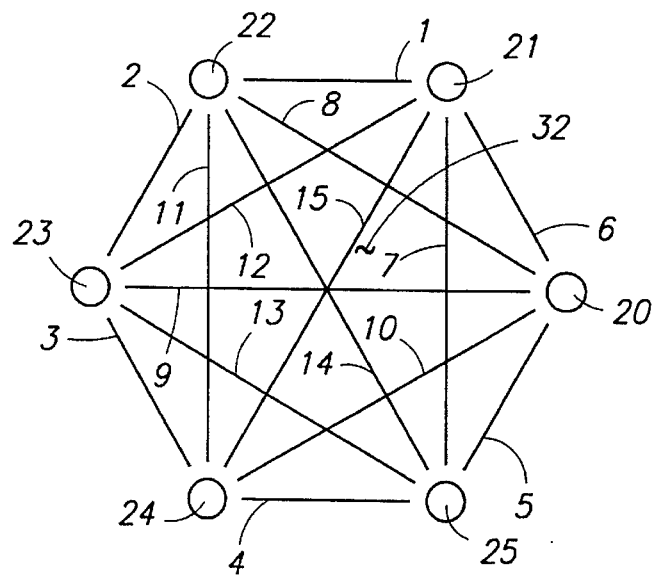
FIG. 2 illustrates a formation of current paths created between six electrodes which are hexagonally arrayed.

FIG. 2 shows an alternative current path formation created between pairs of electrodes 20–25 when neutral electrode 34 is removed from region 32. Fifteen current paths 1–15 are formed through region 32 when six phases of voltages are applied to electrodes 20–25. Preferably, a current path is formed between each electrode and every other electrode in the hexagon. Current paths 1–15 are substantially evenly distributed throughout region resulting in a substantially uniform heating of region 32. The number of current paths created between pairs of electrodes depends upon the number of phases of voltages applied to the electrodes. The following equation defines a minimum number of current paths between pairs of electrodes:

No. of current paths=$[Q_n(Q_n-1)]/2$ where $Q_n$ equals the total number of applied phases of voltages. In the preferred embodiment, six phases of voltages are applied to electrodes 20–25. Using the above equation, applying six phases of voltages results in a minimum number of fifteen current paths (i.e., $[6(6-1)]/2=15$).

Arranging six electrodes as vertices of a substantially equilateral hexagon and applying six phases of voltages to the corresponding electrodes has several significant advantages. First, current paths created between electrodes 20–25 substantially uniformly heat region 32 during the treatment of solid earthen material 30. Uniform heating is achieved without the addition of foreign conductive medium, such as salt water. Uniform heating assists in complete removal of volatile and semi-volatile contaminants contained in solid earthen material 30.

Another significant advantage of the present invention is that relatively low voltages may be applied to the earthen material to effectuate appropriate heating. Due to the hexagonal arrangement, many of the current paths are in parallel. In FIG. 2, parallel current paths include paths 7 and 11; paths 8 and 13; paths 10 and 12; paths 1, 4, and 9; paths 3, 6, and 14; and paths 2, 5, and 15. As a result, the resistances of the paths are also in parallel. Parallel resistances reduce the total resistance of earthen material within region 32. Because total resistance is decreased, the voltages applied to electrodes 20–25 may be reduced. This results in a significant reduction of equipment and power costs for treating solid earthen material 30.

Another advantage of the above described aspect of the invention is that the current supplied to the electrodes is in phase with the power supplied to the treatment site by utility companies. Unity power factor (wherein power factor is the cosine of the phase angle between voltage and current) is therefore achieved. Unity power factor is the most efficient use of power.

Often large areas of soil 1600 are required to be remediated. These large areas can be remediated by use of the instant invention practiced sequentially over each of portions of the specified area in turn.

Alternatively, the instant invention can be utilized by means of sequentially created treatment regions that are induced by switching from a multiplicity of electrodes installed in a pattern throughout the entire area to be remediated.

Figure 16A:
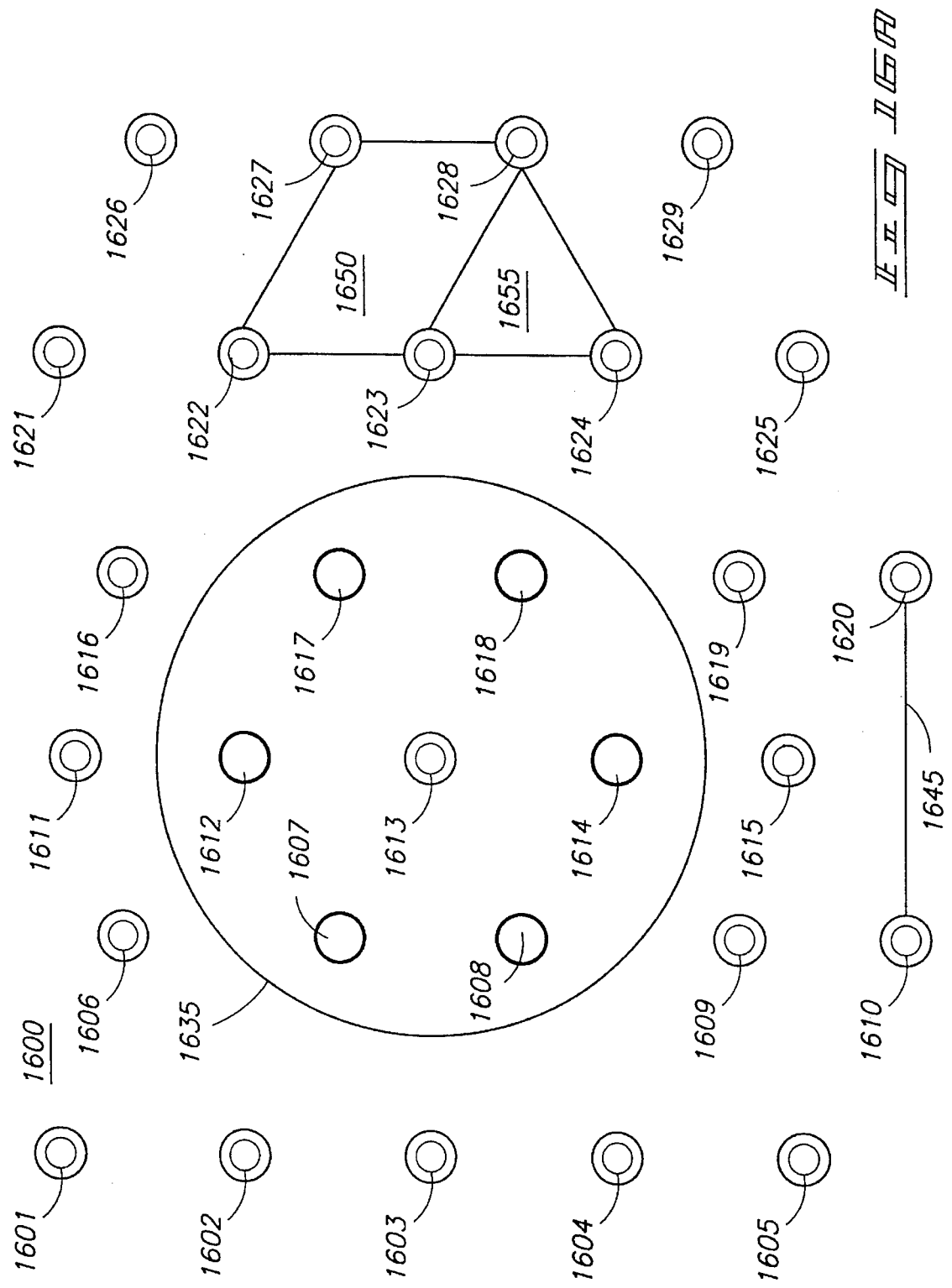
FIG. 16a diagrammatically illustrates the top view of several geometric configurations of electrodes created by electric switching.
Figure 16B:
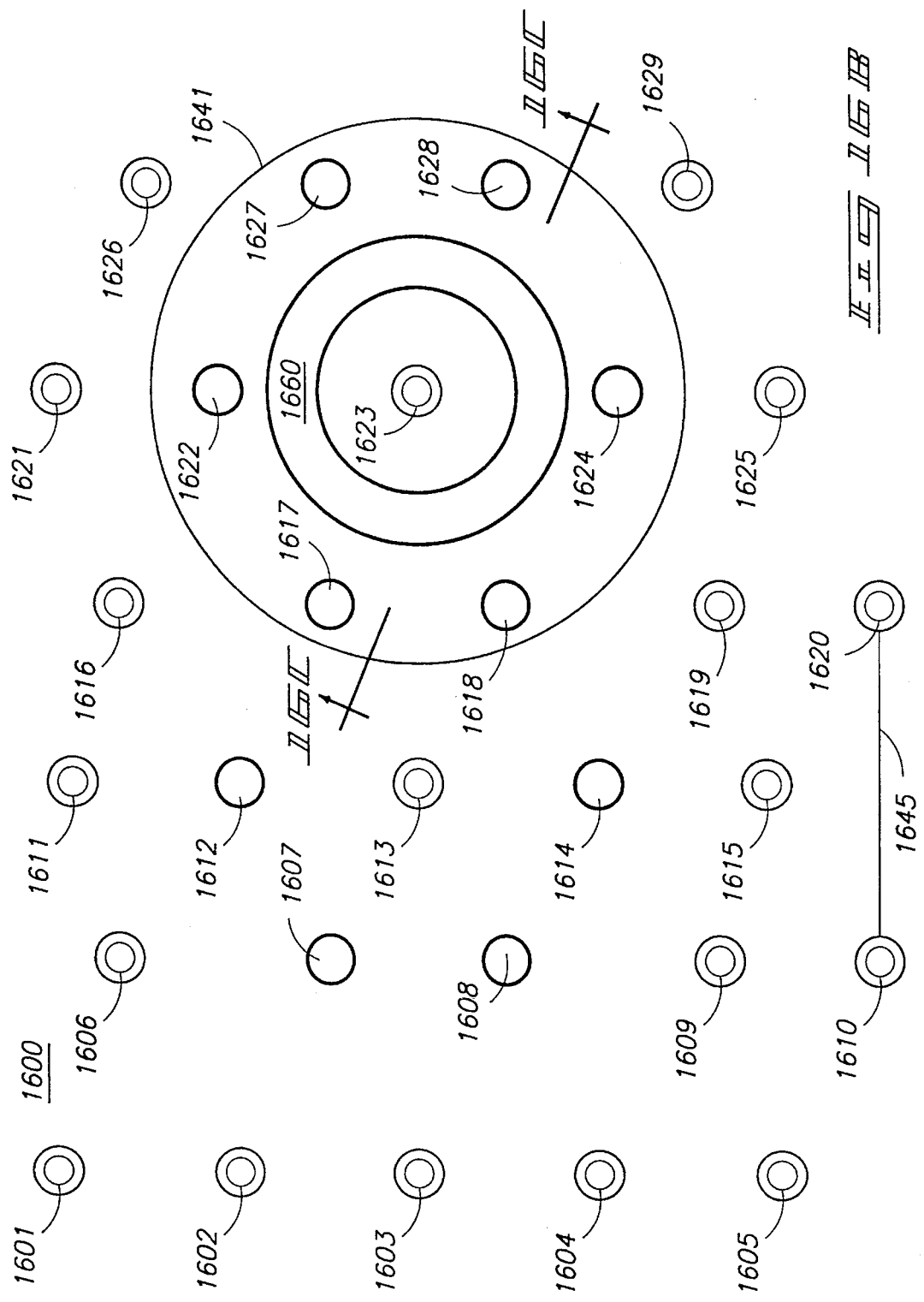
FIG. 16b diagrammatically illustrates a top view of an elongated tordial-shaped heating region (cylindrical in appearance), which is achieved by reversing the field phase sequencing of the electrodes in a hexagonal configuration.
Figure 16C:
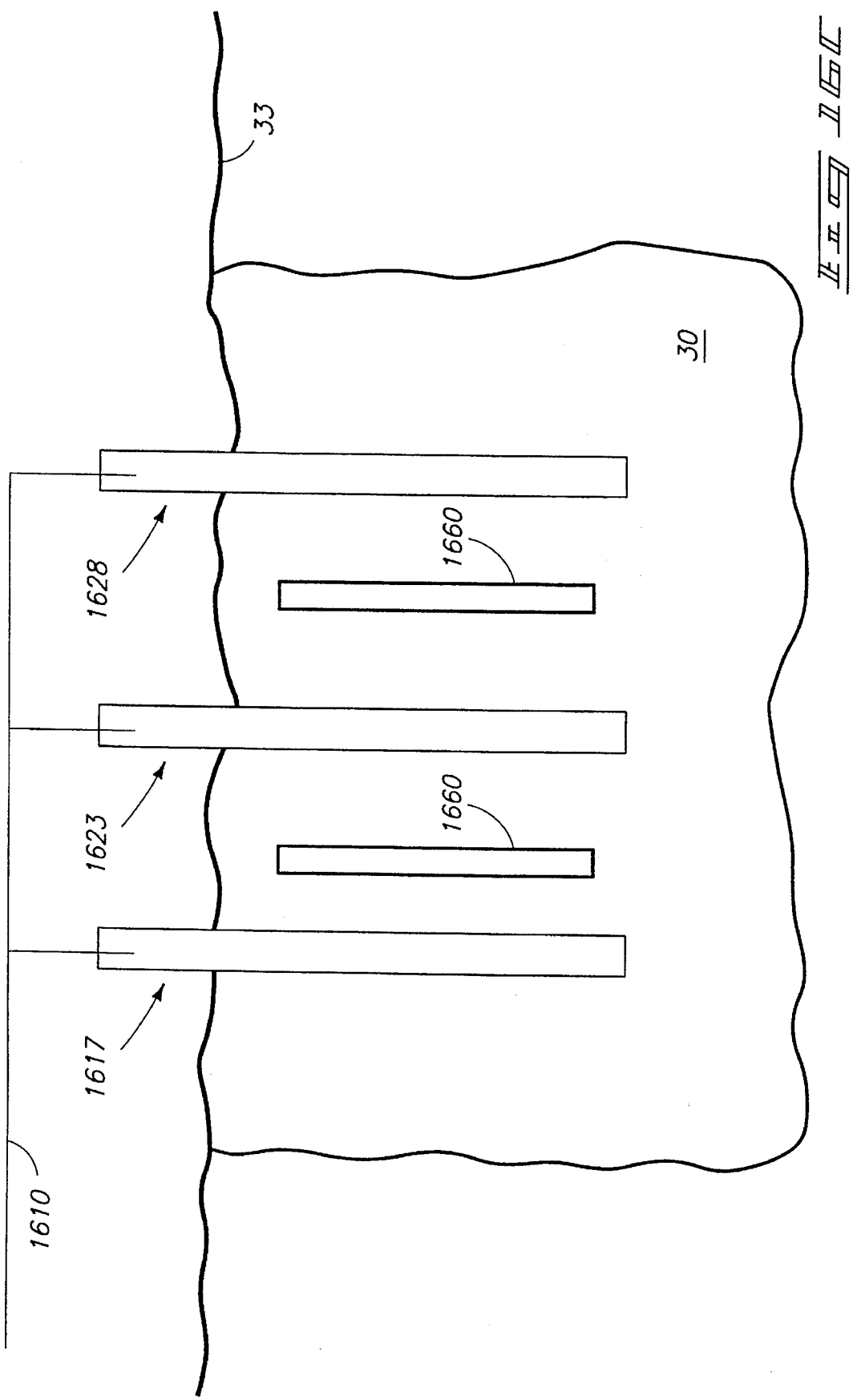
FIG. 16c diagrammatically illustrates the side view of an elongated tordial-shaped heating region (cylindrical in appearance), which is achieved by reversing the field phase sequencing of the electrodes in a hexagonal configuration along lines 16c—16c.
Figure 18:
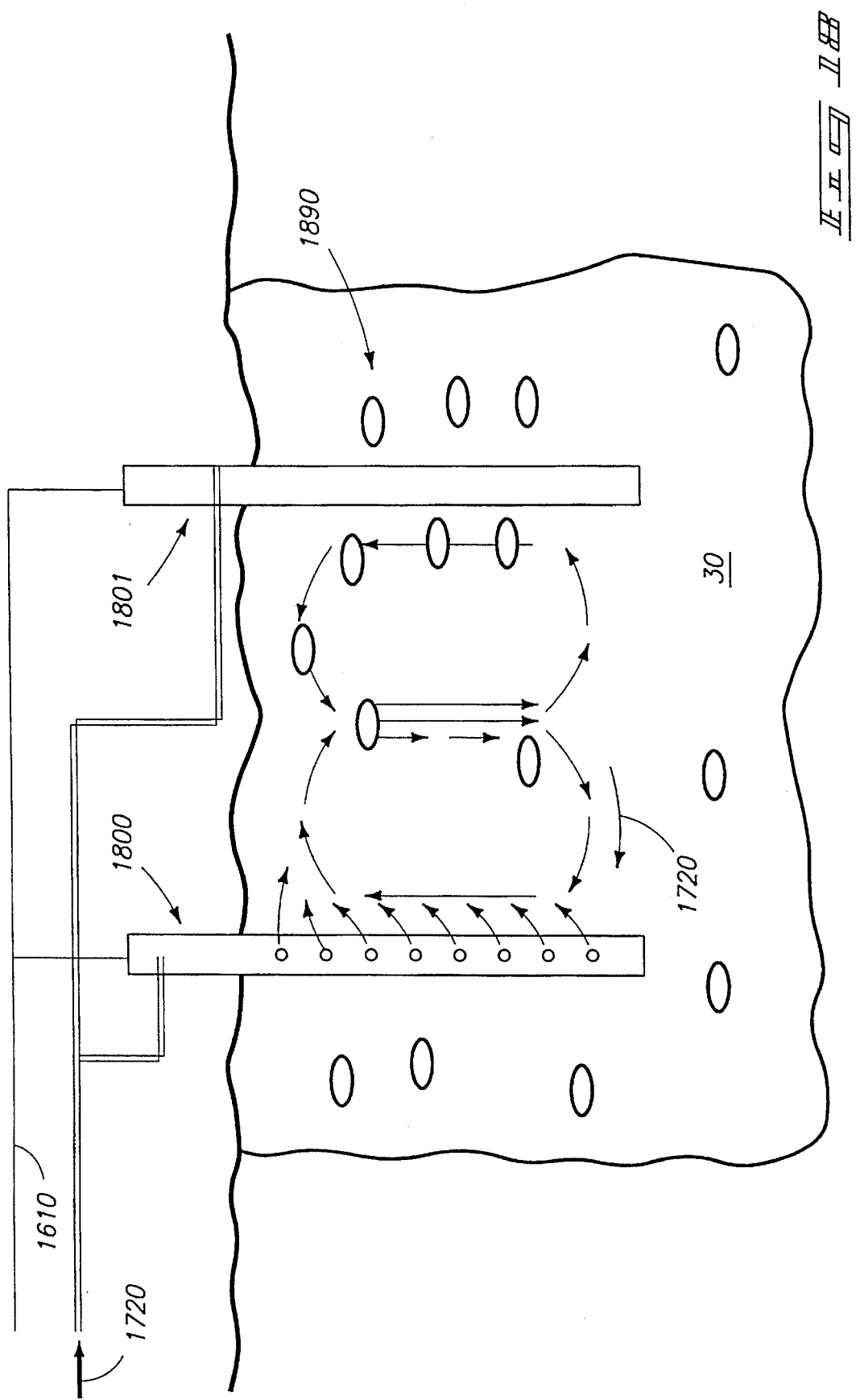
FIG. 18 diagrammatically illustrates the side view of the same area of FIG. 17, further illustrating the entrainment of contaminants within the convection currents.

FIGS. 16a, 16b, and 16c illustrate a large surface area to be remediated 1600 in which a voltage 1610 is applied to the electrodes. Placed in a diamond pattern throughout the entire area are electrodes 1601–1629. The type of pattern used is not critical to the practice of the instant invention. Individual treatment regions can be created by controlled switching of individual electrodes to create an electrically created treatment region. Electrodes 1607, 1609, 1612, 1614, 1617, and 1618 in FIG. 16a form a first electrically created treatment region Using the same electrodes as FIGS. 16a and 16b illustrates a second electrically created treatment region 1640 created by switching power to electrodes 1617, 1618, 1622, 1624, 1627 and 1628. As is readily apparent, a large number of such electrically created treatment regions can be created, limited only by the number of electrodes available. It should be noted that any individual electrode can be in more than one electrically created treatment region.

It should also be noted that while regions 1635 and 1640 are hexagonal, other configurations are possible. Referring again to FIG. 16b, it is apparent that a line 1645 can be formed by electrodes 1610 and 1620. A diamond-shaped region 1650 can be formed by electrodes 1622, 1623, 1627, and 1628. A triangular-shaped region 1655 can be formed by electrodes 1623, 1628, and 1624. The shape of the region has a large number of possible configurations. Additionally, electrical power can be applied to more than one array at any one time. There is no requirement in the instant invention that the pattern be regular. Irregular electrode placement patterns may be used as well.

It should be noted that in order to achieve uniform heating in a non-regular shaped region, the heating between particular electrodes can be adjusted so as to make the heating within the region more uniform. For example, in order to achieve more uniform heating in a parallelogram configuration, more energy can be applied to the long diagonal as opposed to the short diagonal.

The terracing of the selected geometric shape of arrays can also be utilized to enable a uniform heating of large areas of soil.

Surprising results can be obtained by the phase selection. Referring again to FIG. 16b, for example, field rotation in a counter-clockwise direction causes substantially uniform heating, while clockwise rotation of the field causes a torus shaped region 1660 to be heated. FIG. 16c illustrates a side view of region 1660.

The electrodes can induce fluid circulation within a reaction region. This circulation is induced by thermal gradients that are generated by thermal energy imparted to an injected treatment medium or to mobile constituents within the soil. Circulation can also be induced by the electric field of the electrode interacting with the molecular species that make up the treatment medium or the mobile constituents.

Referring to FIG. 17, circulations paths can be established by the placement of electrodes. In FIG. 17, electrodes 1700 and 1701 are positioned in diametrically disposed positions in a treatment region 30.

Once circulation is established, the mobile constituents can be caused to flow through electrical fields that were created to treat the flow of constituents. The circulation can also be used to cause the constituents to flow to an interaction point where treatment medium can be injected. An additional benefit of this method occurs when the region is within the water table. The circulation pattern can be adjusted to increase the residence time within the aquifer.

For example, FIG. 17 illustrates the vortices which is one possible flow pattern that consists of two vortexes 1705 and 1710 that have been created by the thermal energy transfer to the treatment region 30. Vortexes of the mobile constituents of the soil (probably water) would be created by the water 1715 and 1720 rising near the electrode. Near the top of the electrode the water would tend to go out in all directions. However, when placed diametrically opposed to another electrode, the water flowing outward along the surface would meet near the center between the electrodes and would then be forced downward. The downward motion in the center of the region would be enhanced by the cooling that would naturally occur, and the water moved from the vicinity of the electrodes 1700 and 1701.

As is apparent in FIG. 17, a treatment medium, including a fixant, can be pumped into the electrode and caused to become entrained in the circulation pattern 1705 and 1710, via electrode openings 1709 and 1711.

Referring to FIG. 19, it can be seen that any flow that is established in the treatment region 30 can also affect constituents in the soil. One example would be water-soluble contaminants 1890 that become entrained in the circulation pattern. This enables the treatment of in-place contaminants of a broad variety by taking the treatment medium to the contaminant.

Referring to FIG. 19, the movement of contaminants 1890 could be hindered by the following procedure:

(a) inserting a plurality of electrodes (at least 1800 and 1801) into solid earthen material 30, the electrodes being arranged in a selected geometric pattern defining a region of material to be treated, also referred to as a treatment region;

(b) applying at least six phases of voltages 1810 to corresponding ones of the electrodes 1800;

(c) injecting a fixant 1901 into the treatment medium 30;

(d) adjusting the voltages 1810 within a first selected range of voltages 1810 to heat the material substantially uniformly throughout the region to a temperature sufficient to promote the optimal viscosity of the fixant;

(e) controlling the voltages for maintaining the temperature of the material for a time sufficient for the fixant to mix with the contaminants (including other mobile constituents) via the circulation patterns 1705 and 1710.

(f) after adequate mixing, the temperature in the soil can be lowered to the point for the fixant to become immobile, i.e., change phase to the more solid form, thereby at least partially fixing the contaminants within the treatment region 30.

Figures 19A, 19B:
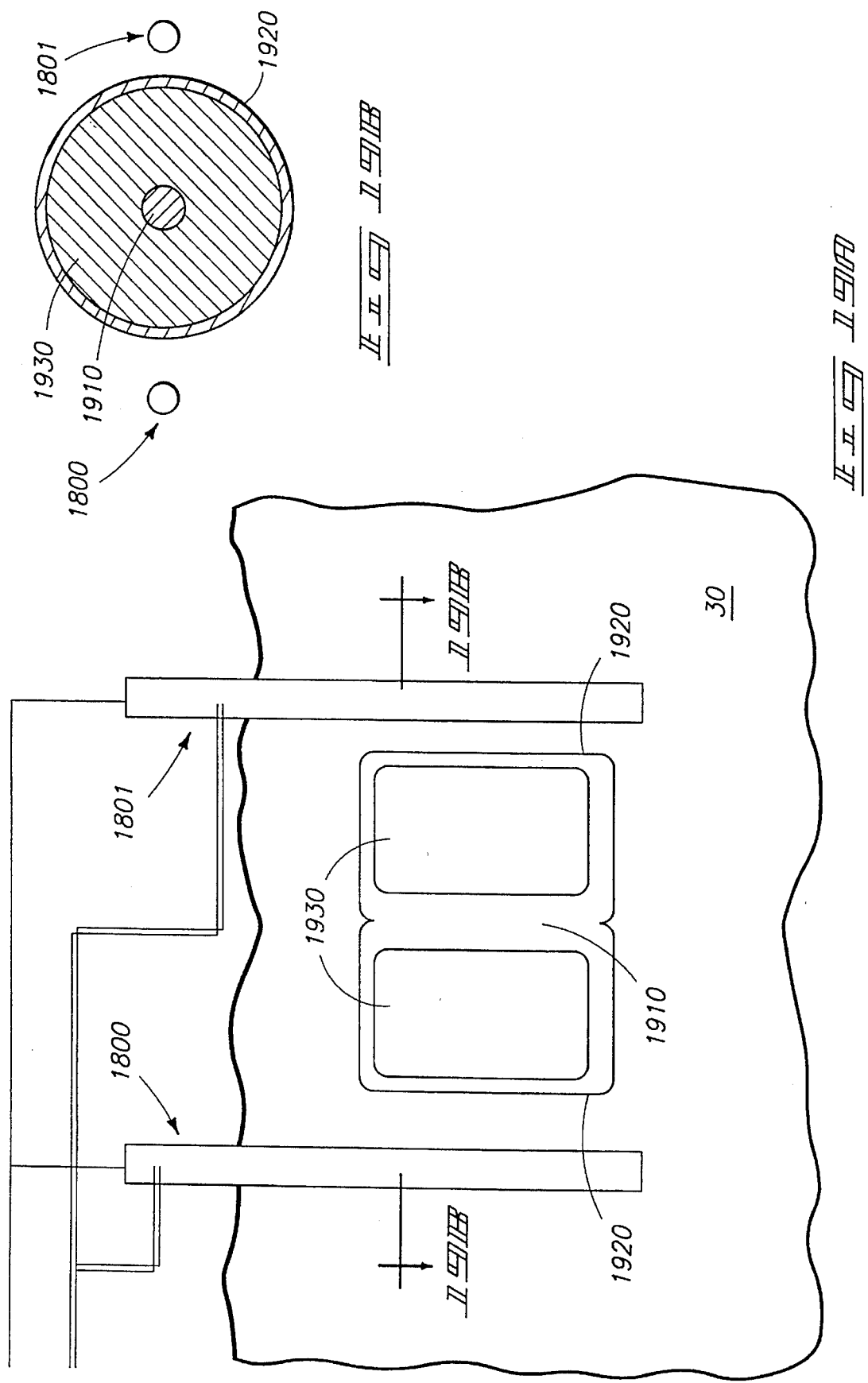
FIG. 19a diagrammatically illustrates the side view of the same area of FIG. 17 when a fixant was added to the convection currents and then solidified in an elongated tordial-shaped heating region (cylindrical in appearance).
FIG. 19b diagrammatically illustrates the top view of the elongated tordial-shaped heating region (cylindrical in appearance) of FIG. 19a along lines 19b–19b.

In the case of vortexes such as 1705 and 1710, the resulting mass of combined fixant-contaminant mixture would form a torus 1930 such as is shown in FIGS. 19a and 19b. Referring to FIG. 19a, it should be noted that the torus will have various levels of concentration of the mixture. For example, in the center 1910 and the outside 1920 of the torus there will generally have a lower concentration than the central region 1930.

As mentioned previously, the mobile constituents within the soil can be caused to move by several means. One of these means is direct electric field effect upon those mobile constituents. Almost any direction of motion can be achieved by varying the electric field in the prescribed manner, said shape not being critical to the invention.

To achieve the desired field shape, direct current, alternating current, or a combination of the two can be used.

Figure 20A:
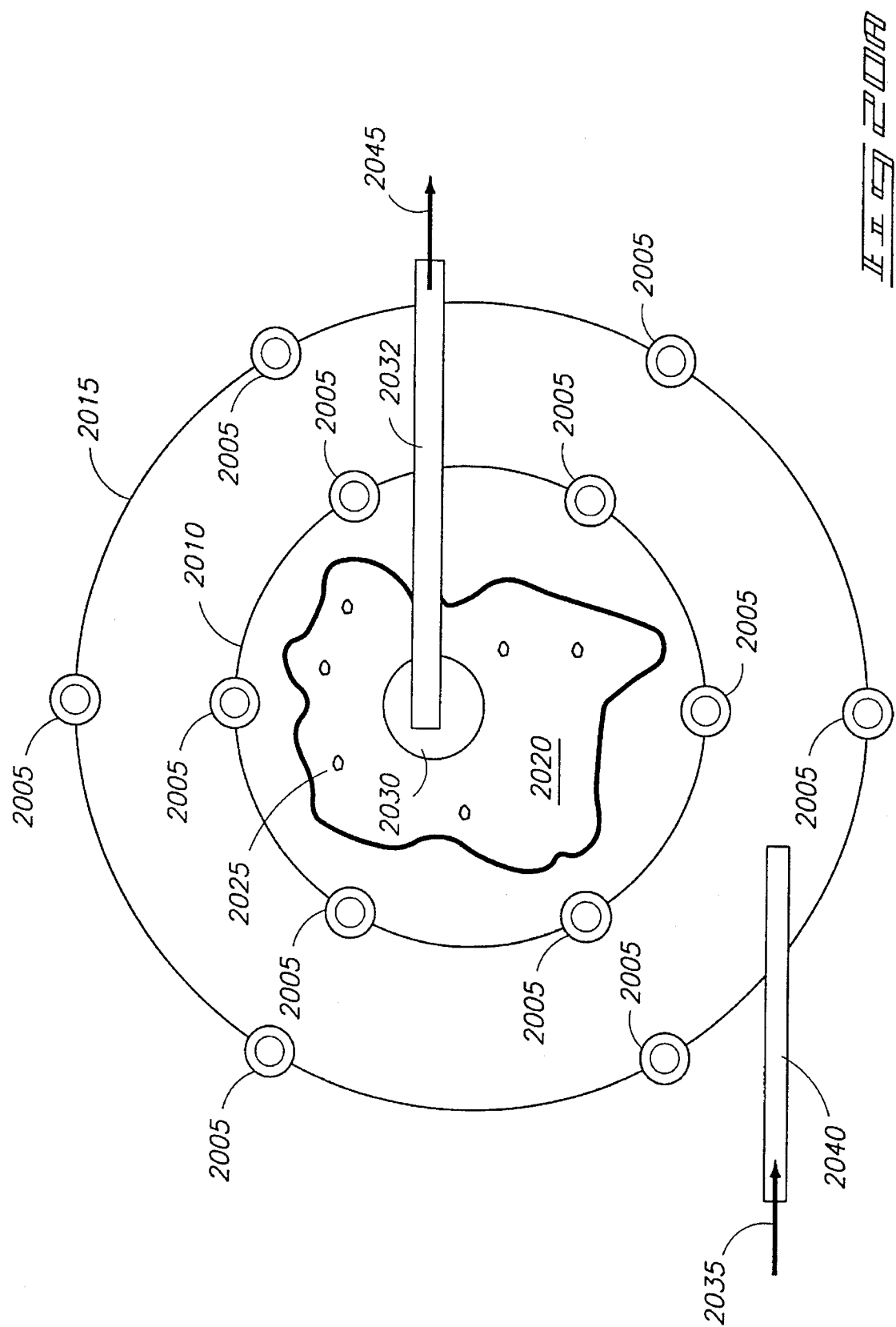
FIG. 20a is a top view that diagrammatically illustrates the electrokinetic movement of fluid for the treatment of contaminants in soil.

Referring to FIG. 20a, an additional embodiment of the invention is illustrated. A plurality of electrodes 2005 are placed in hexagonal or circular patterns 2010 and 2015 around a contamination zone, 2020 two circular configurations are illustrated. However, one row of electrodes 2010 is sufficient to enable the practice of the instant invention.

Now referring to FIG. 20b, contaminants 2025 that are positively charged, such as heavy metals, located within the contamination zone 2020 will be driven toward a collection vessel 2030, having collection ports 2031, by the repulsive forces of a positive electrical potential applied to electrodes 2005. Constituents of the Soil, including the heavy metals contaminants 2035, can be evacuated via an evacuation pipe 2032. To assist in the process a vacuum may be applied to the evacuation pipe 2032.

When an ionic-charged fluid, such as a net positively charged ionic water solution 2035, is introduced into the contamination zone 2020 via a pipe 2040, said fluid 2035 will also be driven toward the collection tube 2030. Over a period of time the cumulative effect of the displacement of the contaminant fluid and the electrically induced motion of the contaminants 2025 will remediate the region. In this embodiment the fluid 2035 and heavy metal mixture 2045 will be driven to the collection point and will exit the evacuation pipe 2032. The mixture will typically be a heavy metal water mixture.

Now referring to FIG. 20c, further minute control of the induced flow may be had by the limiting of the charge to selected portions 2061–2068 of the electrodes. As illustrated in FIG. 20c, contaminants and the injected fluid would be forced toward a central collection point 2060, located on the collection tube 2030, by the downward repulsion of 2061–2064 and the upward force of 2065–2068.

For the purposes of clarity, the electrical power connections were omitted from FIGS. 20a, 20b, and 20c.

A preferred application of this embodiment would be using a current distribution of 80% to six-phase ac and 20% to dc. This distribution produces uniform heating, while the dc current off-sets the preferential drying at the electrodes.

It should be noted that in any embodiment of the instant invention the electrical field induced around the electrodes can cause treatment region constituents to be effected. Therefore, even when unintended, the electric field interaction with the constituents should be considered in observations and data analysis.

Figure 3:
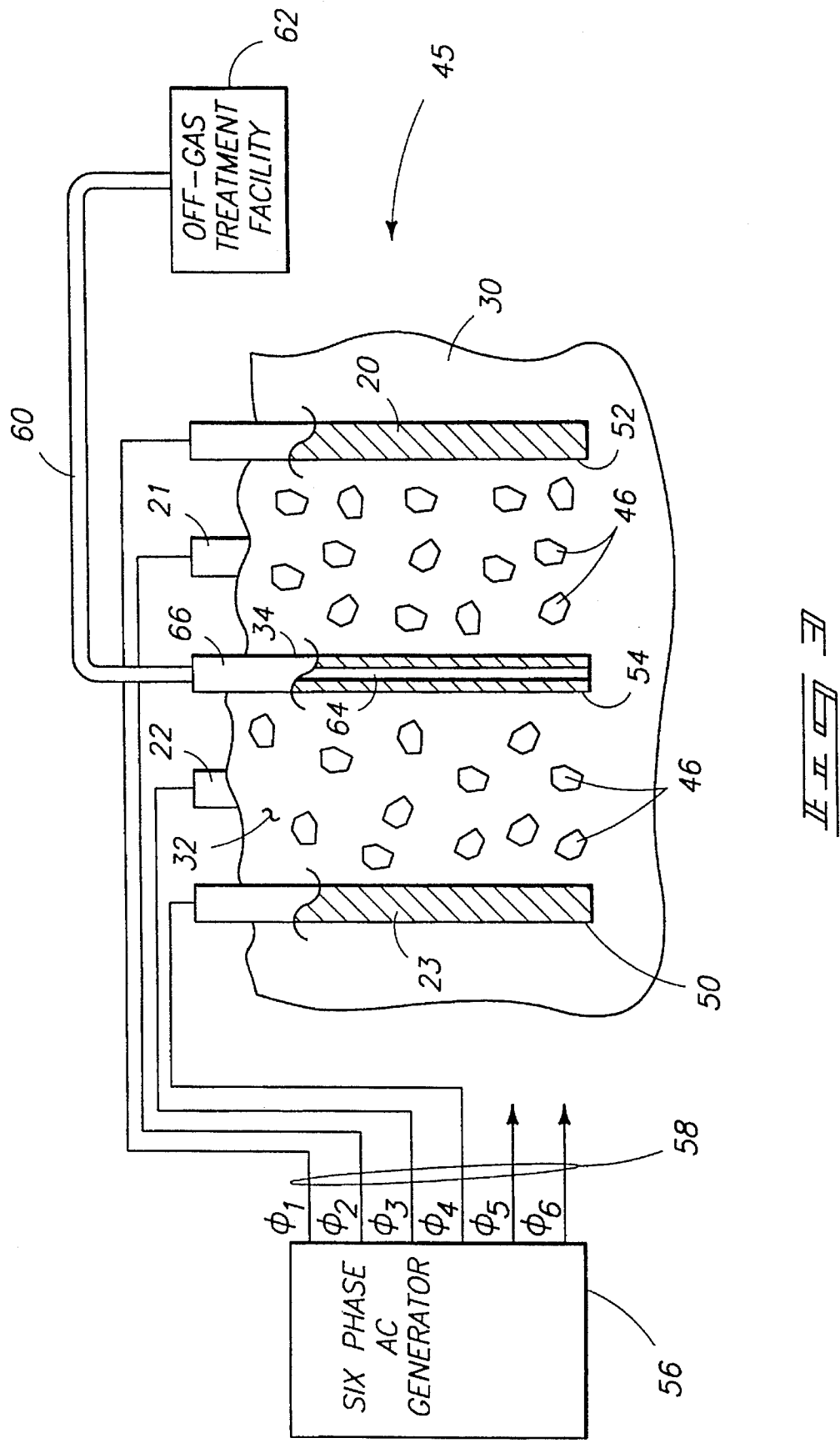
FIG. 3 is a diagrammatical illustration of a system for treating solid earthen material in accordance with an aspect of the present invention.

FIG. 3 diagrammatically illustrates a system 45 for treating earthen material in accordance with the present invention. Electrodes 20–25 are inserted into region 32 of solid earthen material 30 to be treated in an arrangement described above with reference to FIG. 1. Only four peripheral electrodes 20, 21, 22 and 23, and neutral electrode 34, are shown for purposes of clarity. Peripheral electrodes 20–23 and neutral electrode 34 are inserted into solid earthen material 30 in a substantially parallel relation. Electrodes 21–23 and 34 are inserted to a depth sufficient to ensure that most contaminants 46 lie within region 32 and above distal ends of electrodes 21–25, as represented by distal ends 50, 52, and 54.

System 45 includes a six-phase ac generator 56 and an off-gas treatment facility 62. Six-phase ac generator 56 is coupled to peripheral electrodes 20–25. Six conductors 58 electrically connect generator 56 to respective peripheral electrodes 20–25. A different phase of voltage is applied to individual conductors 58. A voltage having phase $\phi_1$ is applied to electrode 20. A voltage having phase $\phi_2$ is applied to electrode 21. Similarly, voltages having phases $\phi_3$–$\phi_6$ are applied to corresponding electrodes 22–25. As discussed above, phases $\phi_1$–$\phi_6$ are preferably 6° apart from each other.

Off-gas treatment facility 62 is connected in fluid communication to neutral electrode 34 through a conduit 60.

Neutral electrode 34 is preferably formed with a hollow passage 64 extending axially therethrough. Passage 64 communicates with solid earthen material 30 and a location external to solid earthen material 30 at end 66 of neutral electrode 34. Neutral electrode 34 can be perforated to facilitate fluid communication between passage 64 and solid earthen material 30. As the voltages are applied to electrodes 20–25 to heat region 32, volatile and semi-volatile contaminants are removed from solid earthen material 30 via passage 64. The contaminants are pulled through conduit 60 to off-gas treatment facility 62. Preferably, off-gas treatment facility 62 has a vacuum to draw the contaminants from solid earthen material 30 through neutral electrode 34 and conduit 60. An advantage to employing an electrically neutral electrode 34 is that conduit 60 to off-gas treatment facility 62 may be connected to electrode 34 without any threat of being electrically shocked. Off-gas treatment facility 62 chemically treats the volatile and semi-volatile contaminants to render the contaminants innocuous. Alternately, the gases can be processed for commercial purposes. The instant invention is not limited to compounds that are gaseous in nature, as the process readily lends itself to the treatment of liquids as well.

Figure 10:
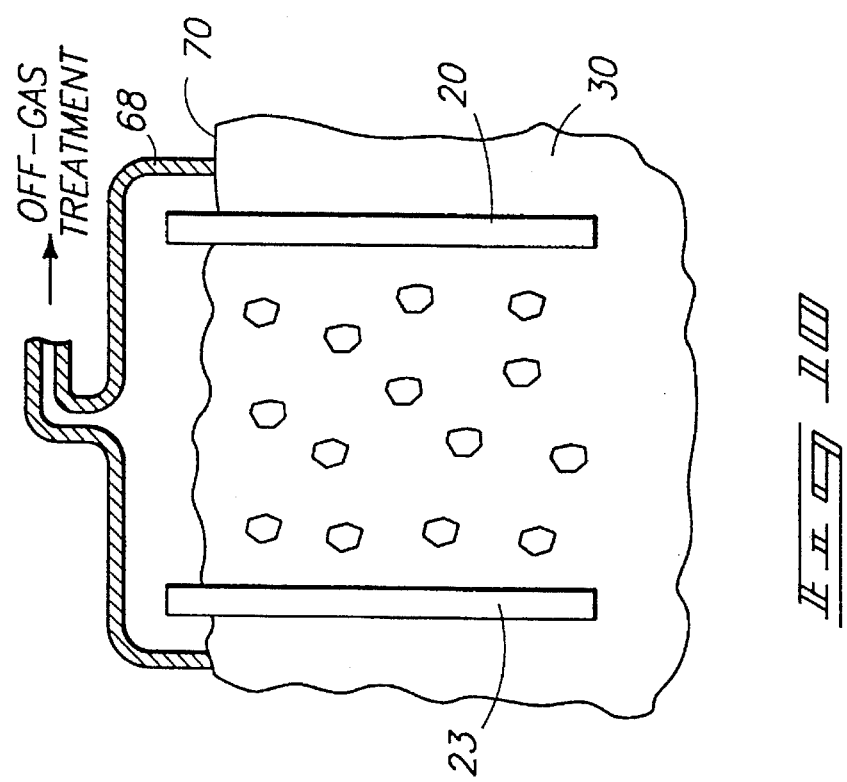
FIG. 10 diagrammatically illustrates an alternative embodiment for venting contaminants from solid earthen material.

FIG. 10 shows an alternative embodiment for venting or removing volatile and semi-volatile contaminants from solid earthen material 30 during the heating process. An off-gas hood 68 is positioned over and encircling electrodes 20–25. Off-gas hood 68 contacts a surface 70 of solid earthen material 30 to minimize the escape of contaminants into the atmosphere. Off-gas hood 68 collects gases during the heating process and transfers the gases to an off-gas treatment facility. Again, the off-gas treatment facility advantageously has a vacuum system to facilitate removal of the gases. In this embodiment, a neutral electrode vent is not utilized and is thus omitted from the figure.

Other hood arrangements are possible. Additionally, a gas barrier may be used in lieu of a hood. Examples include such things as tarps, parking lots, layers of fixants, i.e., and any flow barrier to prevent the escape of gases. At high temperatures, the flammability of the construction materials for the hood 68 (or layer) should be considered to prevent undesired combustion of the layer materials.

Figures 4, 5:
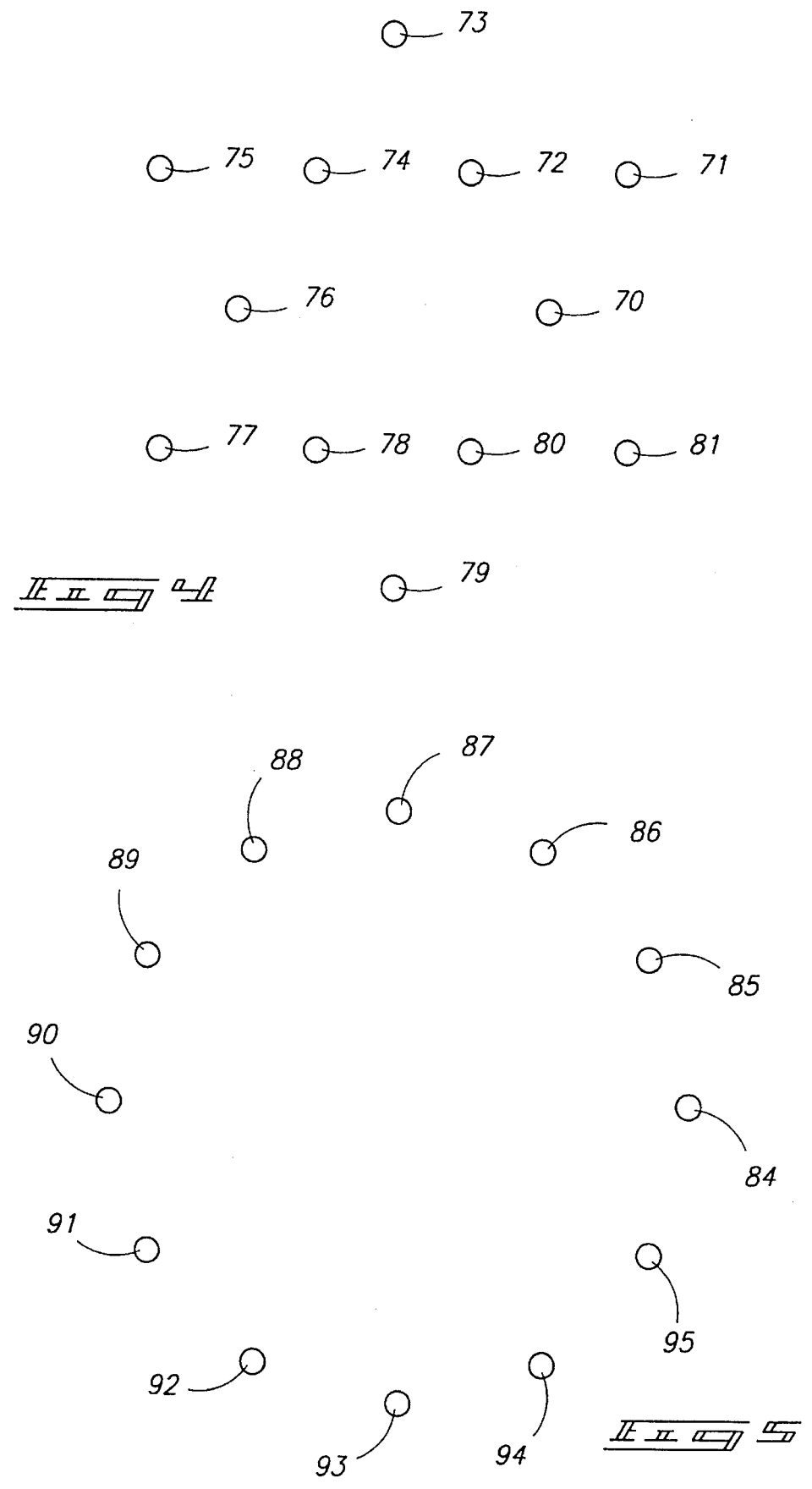

FIGS. 4 and 5 demonstrate alternative electrode arrangements employing more than six electrodes in accordance with an aspect of the present invention. FIG. 4 shows twelve peripheral electrodes, 70–81, are arranged in a star-like shaped polygon. Preferably, the polygon defined by electrodes 70–81 is substantially equilateral, as is shown. FIG. 5 shows twelve electrodes 84–95 arranged at vertices of an equilateral polygon having twelve sides. The vertices also lie in a circumference of a circle.

Other numbers of electrodes may be employed instead of six or twelve electrodes. Additionally, the present invention is described as using six-phase ac voltages, although other multiple phases of voltages may be employed with the six or more electrode arrangement.

FIGS. 6–9 diagrammatically demonstrate a method for treating solid earthen material 30 according to an aspect of the present invention. Solid earthen material 30 has volatile, semi-volatile, and non-volatile contaminants provided therein. The non-volatile contaminants are referenced generally by numeral 100. Multiple electrodes are inserted into solid earthen material 30. Preferably, six peripheral electrodes and one neutral electrode are positioned in an arrangement shown in FIG. 1, but only electrodes 20 and 23 are shown for explanatory purposes. Multiple phases of voltages are applied to the electrodes, and preferably in a manner described above with reference to FIGS. 1 and 2. Neutral electrode 34 is connected to an off-gas treatment facility as explained above with reference to FIG. 2.

Multiple phases of voltages are applied to peripheral electrodes 20–25 to begin heating earthen material 30 (FIG. 6). The appropriate voltage level depends upon many factors including the mineral type and moisture content of earthen material 30, the diameter of electrodes 20–25, the distance between electrodes 20–25, and the length of the electrodes. Voltages increase with increasing distance between electrodes 20–25. Additionally, voltages decrease with increasing water content and electrode diameter. As a general rule, voltage remains the same with electrode length. The voltages are adjusted within a first range of voltages to heat solid earthen material 30 to a temperature sufficient to substantially remove volatile and semi-volatile contaminants from the material. A typical starting voltage for a field-scale operation is about 1000 to 2000 V(ac). Typical power input to earthen material 30 is about 100 to 1000 W/m$^3$.

An advantage to the six-electrode arrangement and application of multiple phases of voltages is that no foreign medium between electrodes is necessary to maintain conduction during all phases of drying. In many prior art methods, conductive material, such as salt water (brine) or NaOH, must be present throughout the region to maintain conduction during drying. However, salt water and NaOH are also contaminants. The present invention eliminates the necessity of adding a foreign contaminant simply to maintain conduction.

Solid earthen material 30 is heated at an approximately constant rate, such as 1° C. per hour. As the earthen material 30 heats, it becomes more conductive. The applied voltages are therefore lowered to maintain a constant rate of heating. Eventually, the voltages are reduced to approximately half of the starting value.

When a target temperature is reached, as for bioremediation, voltages are varied as needed to maintain a steady state temperature of the earthen material 30.

When it is desired to remediate the earthen material by drying and electrical discharge, heating continues until the moisture contained in the material 30 begins to boil. Boiling first occurs around peripheral electrodes 20–25. Next, the moisture inward of the peripheral electrodes near neutral electrode 34 begins to boil. Additionally, some moisture outside of the perimeter defined by peripheral electrodes 20–25 will begin to boil. Moisture near surface 70 of earthen material 30 begins to boil before moisture near the distal ends of electrodes 20–25 farther beneath the surface. The moisture is last to boil near the bottom of electrodes 20–25 because the earthen material below the distal ends of electrodes 20–25 acts as a heat sink to remove heat from the bottom portion of region 32.

The boiling moisture or water forms steam which effectively strips volatile and semi-volatile organic compounds from earthen material 30. Some non-volatile organic contaminants will also be removed with the steam. The steam is removed through passage 64 provided in neutral electrode 34 and transferred to an off-gas treatment facility. Alternatively, the escaping steam can be captured by off-gas hood 68 as shown in FIG. 10.

As water and steam are removed from region 32, earthen material 30 begins to dry. The temperature of region 32 during this drying process is less than the melting temperature of solid earthen material 30. Earthen material 30 is not vitrified. Preferably, the temperature of region 32 is about 0° C. to 100° C.

The resistivity of solid earthen material 30 depends largely upon the moisture content thereof. As region 32 dries, resistivity increases. Therefore, the applied voltages are increased at some point to maintain an approximately constant heating rate. Yet, the power applied to earthen material 30 is preferably maintained at approximately the same level throughout the drying process.

When the moisture content falls below 10 wt % (and, more specifically, between 4 and 7 wt %), voltages applied to the peripheral electrodes must be increased to a second range of voltages. The second range of voltages is greater than the first selected range of voltages. Preferably, the second range of voltages is about 2000 to 6000 V (ac).

Dry regions 102–107 (FIGS. 7 and 9) begin to form around respective electrodes 20–25 as region 32 dries and the applied voltages are increased. Dry regions 102–107 have perimeters which define respective boundaries 110–115 between dry regions 102–107, respectively, and earthen material exterior to the dry regions. Boundaries 110–115 are wet-dry interfaces between dry regions 102–107 and "wet" regions exterior to the dry regions. Boundaries 110–115 are very narrow, and have a thickness of approximately less than one inch.

When the voltages are increased to the second ranges of voltages, a corona discharge is created at boundaries 110–115. A corona discharge provides an intense oxidizing environment which produces electrons, molecular ions, radicals, ion radicals, ozone, peroxides, and ultraviolet light. Corona can be used to oxidize many organic materials, such as town gas (a complex mixture consisting of benzene, toluene, benzo-A-pyrene (BAP), xylene, and naphthalene), trichloroethylene, and carbon tetrachloride. Corona also oxidizes metal such as lead, gold, zinc, arsenic, chromium, uranium, plutonium, and cadmium. Additionally, corona can oxidize radioactive waste such as radioactive salts, including radioactive nitrate.

Earthen material 30 is very dry at this time and acts essentially like a dielectric. This dielectric enables corona to be sustained. The corona causes the formation of a highly chemically reactive plasma. The corona or plasma is at an energy level sufficient to chemically alter the non-volatile contaminants remaining in region 32 of solid earthen material 30.

The efficiency of the plasma reaction depends upon the electron energy released by the corona. The electrons released by in situ corona are a magnitude more energetic than those released by convention conductive (metal) electrodes. This is because the in situ corona occurs on nonconductive (dielectric) earthen particles, which require much higher field gradients to cause gas to emit electrons. Field emissions on dielectric (i.e., nonconductive) earthen particles are called auto-electronic emissions, different than what is commonly meant by "corona".

Conventional "corona" formed on metal electrodes in ambient air has an energy less than 20 eV over a very small plasma volume, such as a few micron-thick sheath. Contaminants passing through the sheath interact directly with the corona (requires approximately 5 eV). Additionally, wet air passing through the sheath forms oxidizing radicals that scavenge and react with some of the rest of the contaminant that does not pass through the sheath. Approximately 10 eV is required to produce one OH radical, and approximately six OH radicals are required to decompose typical organic contaminants. With these yields, good destruction efficiency only occurs on a very small scale. The conversion of contaminants to innocuous $CO/CO_2$ can be as low as a few percent.

Auto-electron emissions on dielectric particles (such as earthen particles) emit electrons at energies of several eV. As a result, a very energetic plasma, with good oxidant yields, is formed (for example, 20–30 OH radicals per electron). Further, more oxidants per coulomb of electricity are produced. The excess of oxidants causes a nearly 100% mineralization of contaminants. Direct destruction of contaminants by electron bombardment is also enhanced, and the plasma volume can directly contact contaminants in a much larger (100 to 1000 micron) sheath. In solid earthen material 30, the ionized sheath extends farther than inter-particle dimensions.

The formation of dry regions 102–107 and the formation of corona at boundaries 110–115 occurs approximately simultaneously. Dry regions 102–107 begin at respective electrodes 20–25 and then move radially outward relative to individual electrodes as the voltages are increased. The corona is carried by wet-dry interfaces or boundaries 110–115. Material exterior to dry regions 102–107 still contains some moisture content which conducts electricity through region 32, which is still exterior to dry regions 102–107. For example, the moisture content within dry regions 102–107 may be 0.5 wt %, and the moisture content in "wet" regions exterior to the dry regions may be 4–7 wt %. Therefore, heating and drying continues throughout region Dry regions 102–107 expand radially outward from respective electrodes 20–25 at a relatively slow rate. The slow movement is caused by the moisture content gradient across boundaries 110–115. The relatively higher moisture content outside dry regions 102–107 impedes expansion of the dry regions. The slow expansion is very advantageous. The slow growth of dry regions 102–107 enables the corona boundaries 110–115 to move slowly through non-volatile contaminants and sorbed or otherwise bounded contaminants. As a result, the corona has sufficient time to decompose the contaminants.

Voltages are increased slowly beyond the second range of voltages to a third range of voltages, if necessary. The third range of voltages can be extremely high, up to 100 kV. As the voltages are increased slowly through the third range of voltages, dry regions 102–107 continue to move radially outward from respective electrodes 20–25. The total power applied to earthen material 30 begins to drop, but the dry regions expand and the corona continues to spread.

Corona boundaries 110–115 encounter non-volatile contaminants and sorbed or otherwise bounded contaminants, referenced generally as 100, as the boundaries move through region 32 (FIG. 7). The corona produces oxidants and reductants that scavenge and react with the remaining contaminants 100. The reaction causes a decomposition of the non-volatilized contaminants 100. Contaminants 100 are often decomposed into volatile fragments which may then be removed through passage 64 of neutral electrode 34 and treated in the off-gas treatment facility.

Eventually, corona boundaries 110–115 pass substantially through region 32 (FIG. 8). As a result, substantially all contaminants within region 32 are removed and/or rendered innocuous. Water, humid air, or steam may then be added to earthen material 30 to restore the earthen material to its natural state.

An advantage of the present invention is that region 32 is substantially uniformly heated due to the arrangement of peripheral electrodes 20–25 and the application of six phases of voltages. The uniform heating is at a temperature which is less than a melting temperature of solid earthen material 30. Solid earthen material 30 is not vitrified during the process. As a result, a substantially lower power setting may be used to treat the contaminated material. Additionally, the voltages required to produce the effective heating are further reduced due to the hexagonal arrangement of electrodes 20–25 which permits the formation of parallel resistances. The reduction in voltages results in a significant reduction in equipment and process costs. Further, a reduction in voltages improves safety.

The drying process removes most volatile and semi-volatile contaminants. The present invention includes formation of a corona front which decomposes any non-volatilized contaminants which remain after the drying process.

Figure 11:
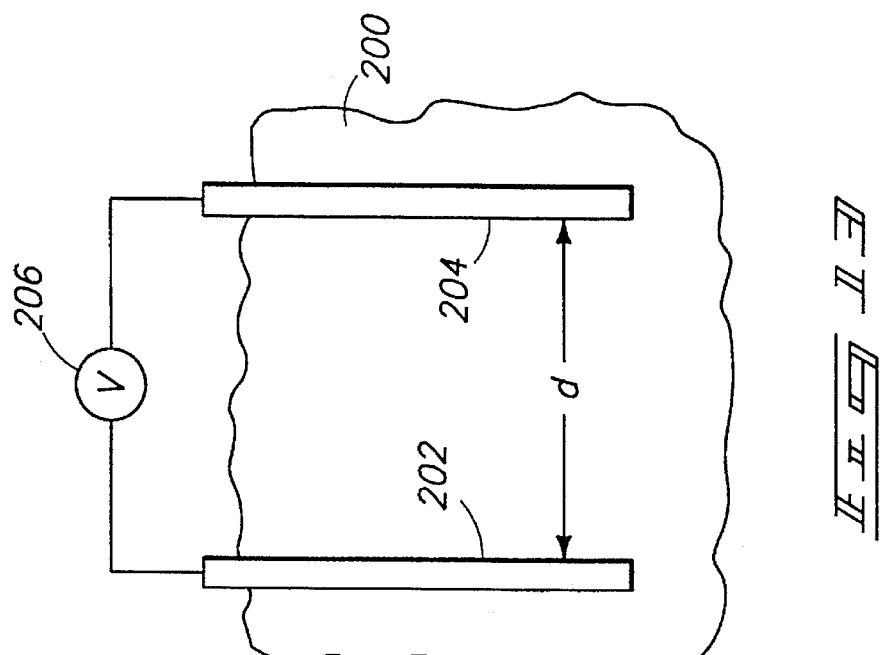
FIG. 11 diagrammatically illustrates a system for treating solid earthen material in accordance with another aspect of the present invention.

FIG. 11 is a diagrammatical illustration showing a system 300 for treating earthen material in accordance with another aspect of the present invention. Six electrodes are inserted into region 32 of solid earthen material 30 to be treated, preferably in a hexagonal arrangement described above with reference to FIG. 1. Only four peripheral electrodes (301, 302, 303, and 304) are shown in this view. Neutral electrode 306 is positioned at an approximately diametric center. Peripheral electrodes 301–304 and neutral electrode 306 are inserted into solid earthen material 30 in a substantially parallel relation. Electrodes 301–304 and 306 are inserted to a depth sufficient to ensure that most contaminants 46 lie within region 32 and above distal ends of electrodes 301–304 and 306, as represented by distal ends 308, 310, and 312. Preferably, peripheral electrodes 301–304 and neutral electrode 306 are substantially cylindrical.

Peripheral electrodes 301–304 and neutral electrode 306 each have a passage extending axially therethrough, which communicates with solid earthen material 30 and a location exterior to solid earthen material 30. For example, peripheral electrodes 301 and 304 have respective passages 314 and 320. Neutral electrode 306 has a passage 324. Peripheral electrodes 301–304 and neutral electrode 306 are perforated to permit fluid communication between earthen material 30 and the passages within the electrodes. Peripheral electrodes 301 and 304 are perforated with multiple through-holes or apertures 318 and 322 to permit fluid communication between solid earthen material 30 and respective passages 314 and 320. Similarly, neutral electrode 306 is perforated with multiple apertures 326.

System 300 includes a six-phase ac generator 330 coupled to peripheral electrodes 301–304. Six conductors 332 electrically connect generator 330 to respective peripheral electrodes 301–304 (and the two electrodes not shown). A different phase of voltage is applied to individual conductors 332 in a manner described above with reference to FIG. 3. The voltages are sufficient to effectuate drying and the creation of corona.

An off-gas treatment facility 334 is connected in fluid communication to neutral electrode 316 through a conduit 336. Off-gas treatment facility 334 is preferably equipped with a vacuum apparatus to draw contaminated gases from solid earthen material 30 through neutral electrode 306 and conduit 336.

System 300 has a pump unit 340 coupled in fluid communication to peripheral electrodes 301–314 through conduit 342. Conduit 342 is connected to peripheral electrodes 301–304 (and the two electrodes not shown). Conduit 342 may be a single conduit with branches going to individual peripheral electrodes, or may be six distinct conduits coupled to corresponding ones of the peripheral electrodes.

A gas supply 344 is coupled in fluid communication to pump unit 340 through conduit 346. Gas supply 344 stores and supplies gases such as air, oxygen, hydrogen, and free electron gases (such as noble gases and molecular nitrogen).

System 300 is different from the embodiment depicted in FIG. 3 in that gases may be injected into solid earthen material 30 to help control the reaction occurring in region 32. A desired gas is supplied by gas supply 344 through conduit 346 into pump unit 340. Pump unit 340 pumps the gas through conduit 342 into peripheral electrodes 301–314. The gas flows through the passages (i.e., 314 and 320) of peripheral electrodes and is forced out through the apertures (i.e., 318 and 322), as shown diagrammatically with arrows. The gases are then pulled through region 32 to neutral electrode 306. The vacuum provided in off-gas treatment facility 334 provides sufficient suction to pull the gases through region 32. The gases are drawn through aperture 326 into passage 324 of neutral electrode 306, as shown with arrows. The gases are then removed through conduit 336 to off-gas treatment facility 334.

Any number of gases may be injected into solid earthen material 30. Oxygen may be injected into region 32 to increase the oxygen content of the region. The excess oxygen helps optimize the rate of reaction as the corona boundary sweeps through region 32. Hydrogen may be added to facilitate chemical reduction. Chemical reduction is often desired to decompose highly chlorinated contaminants, such as carbon tetrachloride ($CCl_4$). Natural gas may be provided to enhance heating of the dry region.

Free-electron gases (such as noble gases and molecular nitrogen) may be injected into region 32 to help reduce the voltages required to sustain corona discharge. Free-electron gases displace free atoms of oxygen, which are electron attaching. Without the addition of free-electron gases, a higher voltage is required to reduce a stronger field to overcome the tendency of electrons to attach to oxygen. Injecting free-electron gases into region 32 displaces some of the free atoms of oxygen, allowing for a reduction in field strength without diminishing corona. As a result, voltages can be reduced.

FIG. 11 also diagrammatically illustrates an alternative aspect of the present invention. System 300 may be adapted with a vacuum unit 350 provided in a recycle loop consisting of conduits 352 and 354. Conduit 352 would be connected in fluid communication with passage 324 of neutral electrode 306. Vacuum unit 350 would provide sufficient suction to remove contaminated gases from region 32. The contaminated gases would then be returned to region 32 through conduit 354, pump unit 340, conduit 342, and peripheral electrodes 301–304. In this embodiment, off-gas treatment facility 334 is not utilized.

According to this aspect of the present invention, the contaminated gases are recycled through the dry regions and through the corona boundaries discussed above with reference to FIGS. 6–9. The contaminated gases are decomposed when passed through the corona discharge. Accordingly, the off-gas produced while treating earthen material 30 is effectively treated by recycling the off gas back through region 32 of earthen material 30.

Figure 12:
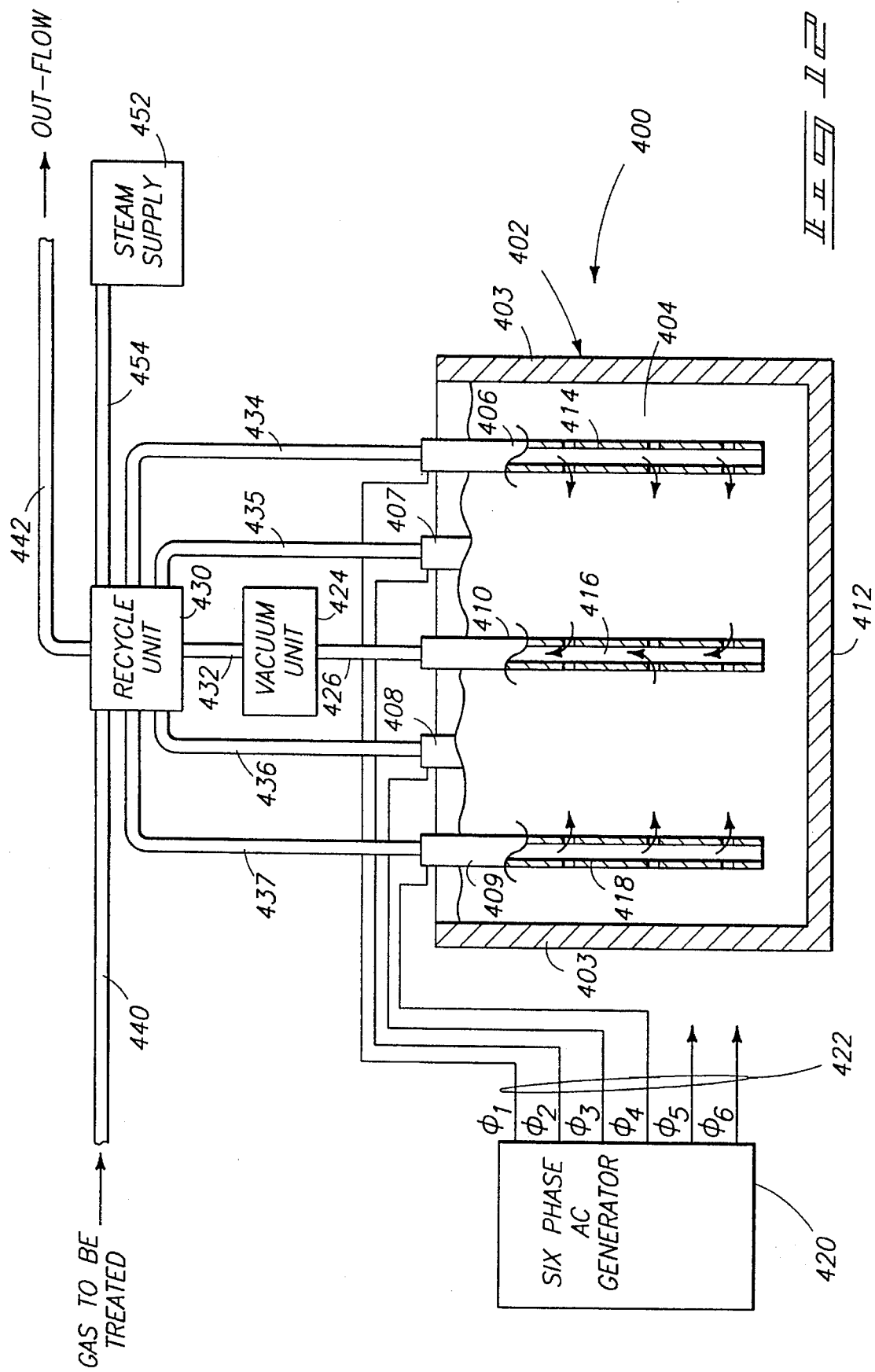
FIG. 12 diagrammatically illustrates an apparatus for treating off gas in accordance with another aspect of the present invention.
Figure 11:
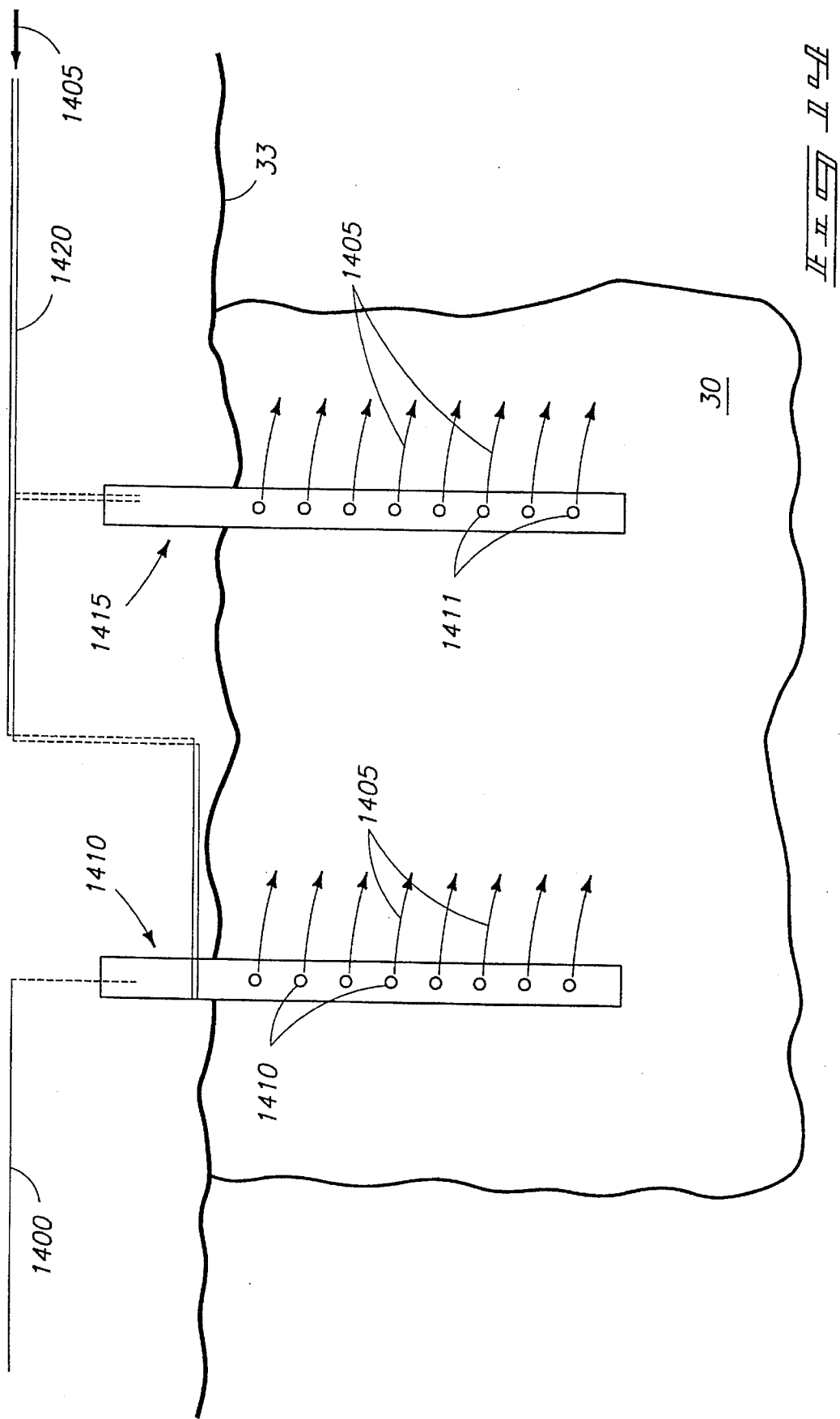

FIG. 12 is a diagrammatic representation of an off-gas treatment apparatus 400 in accordance with another aspect of the present invention. Off-gas treatment apparatus 400 chemically treats contaminated gases, or the like. For example, off-gas treatment apparatus 400 may be used to treat gases such as $NO_x$, or gases produced during in situ vitrification processes, soil vapor extraction operations, or other process exhausts.

Apparatus 400 is preferably dimensioned at a scale to be portable. In this manner, apparatus 400 may be transported to vitrification or extraction sites, or other locations in need of off-gas treatment.

Off-gas treatment apparatus 400 has a container 402 which is preferably formed of a durable plastic or other insulative material. Container 402 has a floor 412 and walls 403, and may be cylindrically shaped or have multiple, substantially flat walls. Container 402 is filled with material 404, such as solid earthen material 30. Preferably, material 404 is sand.

Six peripheral electrodes are inserted into material 404. The peripheral electrodes are preferably arranged at vertices of a substantially equilateral hexagon as shown in FIG. 1. Only four peripheral electrodes (406, 407, 408, and 409) are shown in this illustration. Peripheral electrodes 406–409 are positioned adjacent to and spaced from wall 403 of container 402. A neutral electrode 410 is inserted into a center region of container 402. Peripheral electrodes 406–409 and neutral electrode 410 are inserted to a depth such that distal ends of the electrodes do not contact floor 412 of container 402. Electrodes 406–409 and neutral electrode 410 are substantially hollow and thereby define passages axially therethrough. Electrodes 406, 409, and 410 have respective passages 414, 416, and 418. Peripheral electrodes 406–409 and neutral electrode 410 have through-holes, or apertures, formed therein to permit fluid communication between passages (414, 416, 418) and material 404.

Off-gas treatment apparatus 400 has a six-phase ac generator 420 coupled to peripheral electrodes 406–409. Six-phase ac generator 420 generates six phases of voltages and applies the voltages via conductors 422 to corresponding electrodes 406–409 (and the two electrodes not shown). The voltages applied to the peripheral electrodes are sufficient to create and sustain corona within material 404. The formation of corona is discussed above with reference to Apparatus 400 also has a fluid-removing unit to remove fluid from the material 404. The fluid-removing unit preferably includes a vacuum unit 424 coupled in fluid communication via conduit 426 to neutral electrode 410. Vacuum unit 424 applies sufficient suction to draw gases through material 404 into passage 416 of neutral electrode 410. Alternatively, the fluid-removing unit may comprise a vacuum attached to an off-gas hood positioned above material 404 in container 402, as described above with reference to FIG. 10.

A recycle unit 430 is connected in fluid communication with vacuum unit 424 through conduit 432. The recycle unit is also connected in fluid communication with peripheral electrodes 406–409, through conduits 424, 435, 436, and 437, respectively. Recycle unit 430 receives the gas to be treated via conduit 440. An outflow conduit 442 is provided to exhaust gas which has been treated and rendered innocuous.

Recycle unit 430 can include a pump for pumping gases through conduits 434–437 to peripheral electrodes 406–409. Recycle unit 430 may further include a heater to heat the gas at a temperature sufficient to maintain a vapor state. The gas is at a vaporized temperature when removed from material 404. It may be desirable to maintain the gases in the vapor form and thus heating is required. Alternately, it may be desirable to condense the vapors. If condensation is desired, recycle unit 430 may be equipped with a heat exchanger to cool the extracted vapors and condense the vapors.

In operation, the gas to be treated flows through conduit 440 to recycle unit 430. Recycle unit 430 directs the gases to be treated through conduits 434–437 to respective peripheral electrodes 406–409. The gas flows through respective passages in the peripheral electrodes and out the apertures (as shown by arrows). The gases are drawn through material 404 from peripheral electrodes 406–409 to neutral electrode 410 via the suction provided by vacuum unit 424. The gases enter passage 416 of neutral electrode 410 and are removed through conduits 426 and 432 into recycle unit 430. The gases at this time may be very hot (such as 100° C.).

If these gases are permitted to cool, the gases may condense to leave the vapor state. Recycle unit 430 may heat the gases at a temperature sufficient to maintain a vapor state if desired. The recycle unit 430 forces the gases back through conduits 434–437 to peripheral electrodes 406–409 to continue the recycling and treating process.

The gases are chemically treated as they move between peripheral electrodes 406–409 and neutral electrode 410. This is because six-phase ac generator 420 supplies six phases of voltages to peripheral electrodes 406–409 (and the two electrodes not shown) effective to produce a corona discharge within material 404. The contaminated gases are chemically altered or decomposed as they pass through the corona discharge. Accordingly, recycling the gases through apparatus 400 decomposes the contaminants and renders them innocuous. When the gases are sufficiently decomposed, recycle unit 430 vents these gases through conduit 442.

The use of the container 402 is not essential to the practice of the invention, but it can facilitate the mobility of an apparatus that is an embodiment of the instant invention. The term container 402 is synonymous with the term reaction vessel 402. Each term is a designation for a container into which the solid earthen material 30 may be loaded. Several types of containers or vessels are contemplated in the use of the instant invention. These include barriers that define the reaction region within the soil, mobile vessels, as well as tank located on the surface of the soil.

In accordance with an aspect of the present invention, off-gas treatment apparatus 400 may be equipped with wet air or steam supply 452. Steam supply 452 stores and supplies wet air or steam to recycle unit 430 via conduit 454. The steam can then be injected into material 404 through peripheral electrodes 406–409. Steam may be added to material 404 to effectuate an approximately constant dry region and an approximately stationary corona boundary. That is, corona will remain relatively close to peripheral electrodes 406–409 and not move radially outward through material 404 as described above with reference to FIGS. 6–9. A moving corona front is not as important in this embodiment because non-volatilized contaminants are buried in material 404. A stationary corona boundary is therefore sufficient to decompose the gases being passed therethrough.

Steam may also be supplied, if desired, by gas supply 344 in system 300 shown in FIG. 11.

The embodiments described above with respect to FIGS. 11 and 12 were described as having all peripheral electrodes formed with passages. Alternatively, only one or two peripheral electrodes may be provided with passages and conduits for recycling gases back through the region of material. Additionally, another independent electrode may be added to inject gases into the region to be treated. In this manner, gases would be pumped only to this additional electrode and not to the peripheral electrodes.

Still another method for the treatment of solid earthen material 30 having volatile, semi-volatile, and non-volatile contaminants is the addition of a fixant for the purpose of limiting the mobility of the contaminants.

As with the other embodiments, at least one electrode is inserted into solid earthen material 30. If more than one electrode is used, the preferred arrangement or configuration is obtained by arranging the electrodes in a geometric pattern. The geometric pattern establishes a treatment region.

Single or multiple phases of voltage can be applied to the electrode. Additionally, dc voltage may be employed to assist in the placement of the fixant. If more than one electrode is used, the phases of voltage and the dc voltage can be synchronized to create the desired field shapes and intensity. Creation of field shapes is well known in the art. For example, electrical motors use ac and dc fields to create desired force vectors on charged particles. Once aspect of the instant invention is the use of a desired field shape to exert a desired vector of force upon an ionic constituent (or treatment medium) located within the soil.

Fixant can be injected into the treatment region either through individual conduits or through the electrode(s).

The voltages applied to the electrodes can be adjusted in one or more stages or ranges. For example, the voltage can be increased to maintain the fixant in the liquid phase. Fixants are more mobile in the liquid phase. When desired, the voltage can be adjusted to increase the thermally induced circulation of the fixant within the soil. Natural circulation or a thermal gradient can be used to direct the fixant to a desired area. Also, the voltage can be reduced to allow slow cooling of the fixant to the solid phase. Alternately, the voltage can be shut off to allow for faster cooling of the fixant.

The voltage applied to the electrodes can also be influenced by the electrical conductivity of the type of contaminant, fixant, or other treatment medium that is present in the soil. It should be noted that in some treatment mediums that the resistance R can be temperature dependent. Increased resistance causes an increase in the $P=I^2R$ (or $P=I\times E$) losses which causes more heat to be produced. Therefore, the heating can be controlled by controlling the amount of the conductive substance at that particular location. As the equations above indicate, the energy deposited is dependent both upon the conductivity and the voltage applied. It is therefore apparent that there are a large number of possible combinations of electric field strength and conductivity to establish the desired heating. Conductivity can also be dependent upon the voltage, due to the thermal gradient effecting the motion of the electrically conductive medium, be it fixant, treatment medium, or constituents of the soil.

For instance, a conductive fluid, like water or propleneglycol, containing dissolved salts can be delivered into the peripheral electrodes to create a concentration gradient, hence a gradient in electrical conductivity, outward from each electrode. This gradient can be developed so as to match the gradient in current flux from the electrode surfaces so as to achieve a constant heating flux or power density (constant $I^2R$/unit soil volume) at all soil radii extending from the electrode surfaces. This would create the most uniform heating pattern possible, by eliminating preferred heating (hot spots) near the electrodes. By the same token, "cold spots" could be maintained by creating local regions of even higher electrical conductivity. Further, these regions of higher conductivity could be used as initiation point for corona discharges as discussed supra.

Experiments in which bulk graphite flakes were mixed into a silty soil suggested that corona discharges could be initiated and possibly sustained at the surfaces of the metal flakes distributed throughout the soil. Such a soil/graphite mixture could thus provide a unique medium for producing volumetrically distributed yet otherwise stationary source of corona.

The heating can be substantially uniform throughout the region, or the heat can be supplied to produce thermal gradients. Placement of the electrodes is an important consideration in shape determination for the creation of the desired thermal gradients. Placing the electrodes individually, or opposing each other, with thermal energy being applied, will generate the vortices discussed above. Another example of electrode placement is to place the electrode in a straight line to induce a cylindrically shaped vortex transversely running parallel to the line of electrodes.

As mentioned earlier, these gradients can induce circulation that aid in the placement of the fixant into the needed areas of the treatment region.

This phase change entraps the contaminants within the fixant. Different types of fixants can be selected depending upon the type of contaminants to be treated and the specified treatment criteria. For example, if absorption of aqueous solution is desired, the fixant can consist of a water absorbent material or compound(s).

A wide variety of fixants can be used; for example, microemulsions; surfactants, mixtures of surfactants, water, ionic solutions, hydrocarbons; electro-rheological fluids; a mixture of electrically conductive powders; or electrically conductive polymers.

Various types of microemulsions can be used. For example, both ionic and non-ionic surfactants can be used. Hydrocarbons may also be used, such as paraffins, or natural waxes.

Various types of electro-rheological fluids can be used. For example, mixtures of dispersed phase including starch, various clays, silica gel, talcum powder in non-electrically conductive fluids such as paraffins, silicone, oil, kerosene, gasoline, and mineral oil.

Fixants are selected according to the requirements of the particular site to be treated. For example, some fixants can bond to surface 33 of subsurface structures (vessels, tanks), others to constituents that are loose in the soil, and still others to the soil itself.

In some applications a doping agent is required. The doping agents may be used for a number of reasons, such as to increase conductivity or to cause a specific chemical reaction.

Examples of doping agents include iodine, bromine, ferric cations, and alkali metals.

The use of fixants as a subsurface barrier is another aspect of the instant invention. FIG. 17 illustrated one possible convection path that could be created with thermal gradient caused by the energy being deposited by the electrodes. In this figure, the circulation path of the fixant has been established to have the approximate shape of a vertical oval. Application of proper voltage sequence could cause the fixant to solidify in the configuration illustrated in FIGS. 19a and 19b. The solidified oval would form a barrier to future movements of substances within the treatment region of the soil. Since different types of fixants can be used, the barrier can be constructed to be permeable to any substance desired, and at the same time react or stop the desired substance.

The use of fixants as a treatment region is yet another aspect of the instant invention. A second electrode can be used to drive contaminants into the convection path of the fixant. It is important to note that any treatment medium can be used as well as fixant. For example, the contaminants within the soil can be driven to a convection path carrying nutrients, microbes, or a chemical reactant.

The use of fixants 2100 with subsurface structures is still another aspect of the instant invention and is illustrated in FIGS. 21, 22 and 23. As previously disclosed, the path of the fixant within the soil can be controlled by the proper selection of voltages. This ability to control placement of the fixant can be utilized to cause the fixant to surround a subsurface structure, such as the underground storage tank 2110 illustrated in FIG. 21, which discloses electrical power 2102 being applied to electrodes 2101, 2103, 2105, and 2107, which are placed in diamond configuration around tank 2110 that typically has risers 2111 and 2113.

Once the tank 2110 is surrounded by fixant 2100, the electrical power 2102 can be maintained at the required value for solidification of the fixant 2100.

Now referring to FIG. 23 this will create a barrier 2323 that surrounds the tank. The permeability of the barrier can be controlled by the selection of the fixant.

The conduits described in the present invention may be formed of any material suitable for passing gases. For example, the conduits may be formed of rubber hoses, metal pipe, or any other tube means. Use of conduit to supply substances to electrodes requires the conductivity of the conduit to be considered. This is of particular importance when the substance carried by the conduit is electrically conductive as well.

According to another aspect of the present invention, a method for treating solid earthen material 30 having volatile, semi-volatile, and non-volatile contaminants comprises the steps of:

(a) inserting multiple electrodes into solid earthen material 30, the electrodes defining a region of material to be treated;

(b) applying multiple phases of voltages to corresponding ones of the electrodes;

(c) adjusting the voltages within a first selected range of voltages to heat the material to a temperature sufficient to substantially remove volatile and semi-volatile contaminants from the region of material;

(d) creating dry regions of material around individual electrodes as the material is heated, the dry regions having a periphery which defines a boundary between the dry regions of material and earthen material exterior to the dry regions;

(e) increasing the voltage through a second selected range of voltages effective to form vitrescent earthen material fragments within the dry regions of material;

(f) moving the boundary of the dry regions radially outward from the individual electrodes through the region of material; and (g) decomposing the non-volatile contaminants as the boundary passes over the non-volatile contaminants.

When the voltages are increased through the second range of voltages (i.e., 2000 to 6000 V(ac)), formation of vitrescent fragments can be formed. The fragments are partially or completely melted, vitrified, sintered, or vaporized, and recondensed to form a highly branched or dendritic mineral structure (similar to, but more highly branched than, fulgurites). The fragments have a dendritic appearance and sometimes have a higher density than the density of the surrounding earthen material. The fragments are often hollow or contain bubbles. The dendritic fragments can be retrievable intact from the earthen material 30.

According to another aspect of the present invention, a method for producing vitrescent soil fragments in a soil region comprises the steps of:

(a) placing two conductive elements into a soil region, the conductive elements being spaced apart a selected distance;

(b) applying a voltage across the conductive elements, the voltage being sufficient to form vitrescent soil fragments within the soil region;

(c) reducing the voltage to a level sufficient to solidify the vitrescent soil fragments; and (d) collecting the vitrescent soil fragments after the vitrescent soil fragments have solidified.

FIG. 13 illustrates a method for producing vitrescent soil fragments in accordance with an aspect of the present invention. At least two conductive elements or electrodes 202 and 204 are placed in a soil region 200. Soil 200 is preferably very dry, such as dune sand. The electrodes 202 and 204 are spaced apart a distance "d". A voltage source 206 is coupled to apply a voltage across the electrodes 202 and 204. The voltage applied is sufficient to form vitrescent soil fragments within soil region 200. After formation of the soil fragments, the voltage applied to electrodes 202 and 204 is reduced to a level sufficient to result in solidification of the soil fragments. The resulting soil fragments can have a density higher than the density of the soil 200. The soil fragments may then be collected after the fragments have solidified.

The voltage applied to electrodes 202 and 204 varies considerably. Remarkably, the voltage appears to be independent of the distance "d" between electrodes 202 and 204, and the mineral and moisture content of soil 200. When the electrodes are spaced a distance of 6 to 18 inches, voltages ranging from 2000 volts to 30,000 volts may be applied to produce the soil fragments.

Voltage source 206 may be a dc or ac power supply. Voltage source 206 may be a pulsed power supply which outputs pulses of voltages. These pulses electrically jolt the soil 200 which can facilitate formation of the soil fragments.

More than two electrodes may be used to form the vitrescent soil fragments. In accordance with another aspect of the present invention, six electrodes may be inserted into soil 200 in an arrangement shown in FIG. 2. Six phases of voltages may then be applied to corresponding electrodes at a level effective to form vitrescent soil fragments within soil 200. The voltages may then be reduced so that the fragments can solidify and be collected.

According to another aspect of the present invention, a method for measuring resistivity and moisture content of solid earthen material 30 comprises the steps of:

(a) inserting six electrodes into a region of solid earthen material 30;

(b) applying six phases of voltages to corresponding ones of the electrodes to create current paths between pairs of the electrodes;

(c) adjusting the voltages to a level sufficient to form an electric field within the region of material without substantially altering resistivity and moisture content of the region;

(d) monitoring the voltages;

(e) monitoring the current passing between the pairs of the electrodes; and (f) computing resistivity and moisture content of the material based upon the current and the voltages monitored.

Accurate measurements of moisture content and resistivity of soils or other earth materials are important for many reasons. Farmers are interested in moisture content of their soil. Geologists and geophysicists are interested in the resistivity of soil to help characterize the subterranean geological formations. Characterizing subterranean formations are important for science and for commercial activities such as oil exploration. Accurate soil resistivity measurements are also important for power engineers when attempting to ground power lines.

Present techniques for measuring resistivity and moisture content include placing two to four electrodes into the soil about 50 to 100 feet apart. Voltage is then applied across the electrodes. The current and voltage are monitored to determine moisture content and resistivity. Unfortunately, current does not usually flow directly among the electrodes. Current tends to flow towards the mantel of the earth. Accordingly, the current may flow from one electrode toward the earth mantel and then back towards the other electrode. Current also tends to flow along underground bodies of water or any other path of least resistance. The current may therefore flow in a direction tangential to the path directly between the electrodes. The longer current path results in an inaccurate resistivity and moisture content measurement.

Another problem with present techniques is that measurements as a function of depth are uncertain. The electrodes are typically inserted to a predetermined depth, such as 8 to 10 feet, for each and every measurement in an attempt to standardize measurements.

An approach to solving this problem is to position the electrodes closer together. However, this procedure has a drawback in that only one type of soil may be measured. Placing the electrodes farther apart is desirable because current must pass through many different types of soil. A more accurate measurement can therefore be obtained through this increased distance.

According to the present invention, six electrodes may be inserted into a solid earthen material 30 region in a hexagonal arrangement shown in FIG. 1. Six phases of voltages are applied to the corresponding electrodes to create current paths between pairs of electrodes. The voltages applied to the electrodes are very low. The voltages are sufficient, however, to form an electric field within the region of solid earthen material 30 to be measured. The electric field is at a sufficiently low energy level which does not substantially alter resistivity and moisture content of the region. The voltage and current are then monitored using known amperage and voltage meters. From this, resistivity and moisture content can be computed manually or with specially designed circuitry.

An advantage of employing six electrodes arranged in a substantially equilateral hexagon is that the electric field is substantially constrained within the hexagon. The shape of the electric field is thus readily discernable. Therefore, accurate measurements of resistivity and moisture content may be obtained as a function of depth. Conventional techniques are unable to compute accurately resistivity and moisture content as a function of depth.

Middle electrode 34, although preferably neutral, can have a voltage applied thereto. Applying a voltage to electrode 34 would unbalance the uniform heating of region 32 within peripheral electrodes 20–25. For example, heating may be unbalanced so that a hot region is formed close to middle electrode 34.

Still another aspect of the instant invention is one in which electrically conductive powders are used as a fixant or as a treatment medium. Additionally, FIG. 24 illustrates that there is still another use of electrically conductive powders to solve specific technical problems inherent in the practice of the instant invention. One such problem is the drying of the soil in the immediate vicinity 2400 of the electrodes 2405 and 2410 As mentioned previously, the presence of water (or any substance) in the soil 30 can affect the conductivity. Since there is generally a higher temperature in the immediate vicinity 2400 of the electrodes 2405 and there is a tendency for there to be more drying in that vicinity. In FIG. 24, the energy deposited at the electrodes is due to electrical power 2415 being applied at the electrodes. The dryness results in a loss of conductivity.

Referring again to FIG. 24, electrically conductive powders 2120, 2125, and 2530 may be placed in the region where the drying is the highest, and can make up for the loss of conductivity due to drying. FIG. 24 further illustrates the use of multiple layers of electrically conductive material. The top layer 2125 should have the largest granule sized material, followed by the middle layer 2125, which should of be medium granule size when compared to the largest sized granules on the top layer 2120 and on the bottom layer 2130. The packing configuration enables the use of conductive liquids 2135 to increase conductivity. Another possible embodiment of the invention is the application of a contaminated liquid to be treated as the conductive liquid 2135. The variation of granule size further enables a more uniform vertical distribution of the conductive fluid 2135.

The pipe or hose connection 2140 used to deposit the conductive fluid should be insulated from both the soil and the electrode due to equipment and personnel hazards. Additionally, dripping as opposed to a steady stream enables the reduction of shock hazard.

Ground carbon is one example of an electrically conductive powder, but metal filings may also be used.

In compliance with the statute, the invention has been described in language more or less specific as to structural and methodical features. It is to be understood, however, that the invention is not limited to the specific features shown and described, since the means herein disclosed comprises preferred forms of putting the invention into effect. The invention is, therefore, claimed in any of its forms or modifications within the proper scope of the appended claims, appropriately interpreted in accordance with the doctrine of equivalents.

We claim:

1. The method of treating waste sites and areas containing hazardous volatizable, semivolatizable, and non-volatizable contaminants, said method comprising:

inserting at least two electrodes through the soil surface into the ground proximate said waste site and at spaced points from one another in a substantially encompassing array to at least a portion of said waste site, heating a region of ground adjacent the soil surface and therebelow to a temperature below the melting temperature thereof by applying at least one voltage to at least one of the electrodes, said temperature being greater than 100° and less than 1200° C., for an extended period of time in order to volatilize said material by applying a voltage between a pair of said electrodes adjacent the soil surface spanning said region for causing a current flow through said ground region therebetween of a value less than would melt the soil, injecting conductive fluids into the earthen material;

adjusting the voltage within a selected range within the solid earthen material;

whereby said contaminants are treated within the waste site.

2. The method in claim 1, wherein the solid earthen material is within a treatment region.

3. The method in claim 2, wherein the treatment region is a reaction vessel.

4. The method in claim 3, wherein the reaction vessel is an above-ground tank.

5. The method in claim 1, wherein said voltage is adjusted to produce heat.

6. The method in claim 5, wherein said heating is controlled to discourage microbial growth in a nutrient feed zone and to encourage microbial growth beyond the nutrient feed zone.

7. The method in claim 1, wherein the voltage induces thermal gradients within the treatment region.

8. The method in claim 7, wherein said thermal gradients induce circulation of at least one mobile constituent within the reaction region.

9. The method in claim 8, wherein the thermal gradients within a reaction region enhances the distribution of at least one nutrient.

10. The method in claim 8, wherein said mobile constituent flow is heated.

11. The method in claim 1, wherein the electric field from said electrodes induces flow in an ionic bearing fluid constituent of said treatment region.

12. The method in claim 11, wherein said ionic bearing fluid is a heavy metal-water solution.

13. The method in claim 1, wherein the area of the electrical potential from said electrodes defines a treatment region.

14. The method in claim 13, wherein mobile constituents of the solid earthen material flow through said treatment region.

15. The method in claim 13, wherein said treatment medium flows through said treatment region.

16. The method in claim 13, wherein constituents of the solid earthen material are treated as they flow through said treatment region.

17. The method in claim 13, wherein the treatment medium is a contaminated fluid introduced to the treatment region.

18. The method in claim 17, wherein the contaminated fluid is injected into the treatment region via a conduit.

19. The method in claim 1, wherein a treatment region is created by reversal of said phasing.

20. The method in claim 19, wherein said reversal of phasing causes a substantially torus-shaped treatment region.

21. The method in claim 5, wherein said heat is augmented by the combustion of a combustible fluid injected into the solid earthen material.

22. The method in claim 21, wherein said combustible fluid is ignited by an electrical spark.

23. The method in claim 21, wherein said combustible fluid is ignited by an ignition device within the treatment region.

24. The method in claim 11, wherein the selected geometric pattern is a regular geometric pattern.

25. The method in claim 11, wherein the selected geometric pattern is an irregularly shaped geometric pattern.

26. The method in claim 11, wherein voltage is applied sequentially to a multiplicity of electrodes, wherein treatment regions are created in selected geometric patterns in a timed sequence.

27. The method in claim 26, wherein voltage is applied to said selected geometric patterns which are created sequentially with respect to time in a repeating of said selected geometric patterns.

28. The method in claim 27, wherein said selected geometric pattern is created in sequence until all areas within the treatment region have been treated.

29. A method for treating solid earthen material having volatile, semi-volatile, and non-volatile contaminants, the method comprising the steps of:
(a) inserting a plurality of electrodes into solid earthen material, the electrodes being arranged in a selected geometric perimeter defining a region of material to be treated;
(b) applying at least two phases of voltages to corresponding ones of the electrodes;
(c) injecting a fixant into the earthen material;
(d) adjusting the voltages within a first selected range of voltages to control fixant throughout the region;
whereby said contaminants are fixed into position within the solid earthen material.

30. A method for treating solid earthen material having volatile, semi-volatile, and non-volatile contaminants, the method comprising the steps of:
(a) inserting a plurality of electrodes into solid earthen material, the electrodes being arranged in a selected geometric perimeter defining a region of material to be treated;
(b) applying at least six phases of voltages to corresponding ones of the electrodes;
(c) injecting fixant into the earthen material;
(d) adjusting the voltages within a first selected range of voltages to heat the material substantially uniformly throughout the region to a temperature sufficient to promote the fixant within the region to remain in the liquid phase;
(e) controlling the voltages for maintaining the temperature of the material for a time sufficient for the fixant to flow throughout the earthen material; and
(f) allowing said fixant and earthen material to cool;
whereby said contaminants are fixed into position within the solid earthen material.

31. The method in claim 29, wherein the fixant encapsulates the contaminant.

32. The method in claim 29, wherein the fixant restricts the mobility of the contaminant.

33. The method in claim 29, wherein the fixant is a water absorbent.

34. The method in claim 29, wherein the molecular structure phase of the fixant is determined by at least one electrical field from at least one of said electrodes.

35. The method in claim 29, wherein the fixant is electrically conductive.

36. The method in claim 29, wherein the mixture of electrically conductive powders is composed of carbon particles.

37. The method in claim 29, wherein the mixture of electrically conductive powders is composed of at least a first layer and a second layer of carbon particles, said first layer being superiorly located with respect to said second layer and of a larger granule size.

38. The method in claim 29, wherein the electrically conductive fixant contains a doping agent.

39. The method in claim 29, wherein the fixant is a water barrier at ambient temperatures.

40. The method in claim 29, wherein the fixant is an impermeable barrier at ambient temperatures.

41. The method in claim 29, wherein the fixant is a semi-impermeable barrier at ambient temperatures.

42. The method in claim 29, wherein the fixant's mobility is controlled by electrode voltage to generate thermal gradients.

43. The method in claim 29, wherein the voltage is applied sequentially to a multiplicity of electrodes, wherein treatment regions are created in a predetermined pattern.

44. The method in claim 29, wherein the solid earthen material surrounds a structure within the earthen material.

45. The method in claim 43, wherein the structure is a storage container.

46. The method in claim 44, wherein the structure is an underground storage tank.

47. The method in claim 43, wherein the fixant bonds to said structure.

48. The method in claim 1 wherein the selected geometric pattern is a diamond.

49. The method in claim 1 wherein the selected geometric pattern is a square.

50. The method in claim 1 wherein the selected geometric pattern is a triangle.

51. The method in claim 1 wherein the selected geometric pattern is a straight line.

52. The method in claim 1 wherein the selected geometric pattern is an irregular polygon.

53. The method in claim 1 wherein the selected geometric pattern is a regular polygon.

54. The method in claim 29, wherein the fixant is microemulsion.

55. The method in claim 29, wherein the fixant is surfactants.

56. The method in claim 29, wherein the fixant is mixtures of surfactants and water.

57. The method in claim 29, wherein the fixant is hydrocarbons.

58. The method in claim 29, wherein the fixant is electrorheological fluids.

59. The method in claim 29, wherein the fixant is mixture of electrically conductive powders.

60. The method in claim 29, wherein the fixant is electrically conductive polymers.

61. The method in claim 29, wherein the fixant contains iodine as an electrically conductive doping agent.

62. The method in claim 29, wherein the fixant contains bromine as an electrically conductive doping agent.

63. The method in claim 29, wherein the fixant contains ferric cations as an electrically conductive doping agent.

64. The method in claim 29, wherein the fixant contains alkali metals as an electrically conductive doping agent.

* * * * *

UNITED STATES PATENT AND TRADEMARK OFFICE
CERTIFICATE OF CORRECTION

PATENT NO. : 5,545,803
DATED : 08/13/96
INVENTOR(S) : Heath et al.

It is certified that error appears in the above-indentified patent and that said Letters Patent is hereby corrected as shown below:

In column 5, line 41, after the word "material", please insert --30;--.

In column 5, line 62, after the word "rial", please insert --30;--.

In column 8, line 26, please replace "2Z" with the number --21--.

In column 8, line 52, please replace "2Z " with the number --21--.

In column 10, line 13, after the word "region", please insert --1635.--.

In column 11, line 16, please replace "171O" with --1710--.

In column 11, line 18, please replace the number "19" with --18--.

In column 12, line 54, please replace the number "21" with --20--.

In column 12, line 65, pleae replace "6° " with --60°--.

In column17, line 50, please replace the number "316" with --306--.

In column 19, line 44, please replace the number "424" with --434--.

In column 24, line 23, please replace the number "2000" with --1000--.

UNITED STATES PATENT AND TRADEMARK OFFICE
CERTIFICATE OF CORRECTION

PATENT NO. : 5,545,803
DATED : 08/13/96
INVENTOR(S) : Heath, et al.

It is certified that error appears in the above-indentified patent and that said Letters Patent is hereby corrected as shown below:

In column 24, line 32, after the word "FIG.", please replace the number "2" with --1--.

Signed and Sealed this

Twenty-sixth Day of August, 1997

Attest:

BRUCE LEHMAN

*Attesting Officer*   Commissioner of Patents and Trademarks